(12) United States Patent
Rosen et al.

(10) Patent No.: US 11,667,658 B2
(45) Date of Patent: Jun. 6, 2023

(54) CHEMICAL SYNTHESIS OF THE ORGANOARSENICAL ANTIBIOTIC ARSINOTHRICIN

(71) Applicants: Barry P. Rosen, Boynton Beach, FL (US); Masafumi Yoshinaga, Doral, FL (US); Stanislaw F. Wnuk, Miami, FL (US); Md Abu Hasan Howlader, Miami, FL (US); Sk Md Sazzad Hossain Suzol, Philadelphia, PA (US)

(72) Inventors: Barry P. Rosen, Boynton Beach, FL (US); Masafumi Yoshinaga, Doral, FL (US); Stanislaw F. Wnuk, Miami, FL (US); Md Abu Hasan Howlader, Miami, FL (US); Sk Md Sazzad Hossain Suzol, Philadelphia, PA (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 18/074,835

(22) Filed: Dec. 5, 2022

(65) Prior Publication Data
US 2023/0093812 A1    Mar. 30, 2023

Related U.S. Application Data

(62) Division of application No. 17/363,993, filed on Jun. 30, 2021, now Pat. No. 11,518,775.

(51) Int. Cl.
*C07F 9/72*    (2006.01)
(52) U.S. Cl.
CPC ..................... *C07F 9/72* (2013.01)

(58) Field of Classification Search
CPC .......................................................... C07F 9/72
USPC ............................................................ 556/72
See application file for complete search history.

(56) References Cited

PUBLICATIONS

Howlader, A.H., et al., "Chemical synthesis of the organoarsenical antibiotic arsinothrcin." Apr. 2021, poster, Department of Cellular Biology and Pharmacology, Herbert Wertheim College of Medicine, Florida International University, Miami, FL, USA.
Howlader, A.H., et al., "Chemical synthesis of the organoarsenical antibiotic arsinothricin." RSC Advances, 2021, 11:35600-35606.
Nadar, V.S., et al., "Arsinothricin, an arsenic-containing non-proteinogenic amino acid analog of glutamate, is a broad-spectrum antibiotic." Communications Biology, 2019, 2(131): 1-12.
Suzol, S.H., et al., "Semisynthesis of the Organoarsenical Antibiotic Arsinothricin." J Nat Prod., 2020, 83(9): 2809-2813.

*Primary Examiner* — Kristin A Vajda
(74) *Attorney, Agent, or Firm* — Saliwanchik, Lloyd & Eisenschenk

(57) ABSTRACT

The subject invention provides methods for the chemical synthesis of racemic arsinothricin (D,L-AST), the novel organoarsenical antibiotic. One is by condensation of the 2-chloroethyl(methyl)arsinic acid with acetamidomalonate, and the second involves reduction of the N-acetyl-protected derivative of hydroxyarsinothricin (AST-OH) and subsequent methylation of the resulting sodium salt of trivalent arsenic intermediate with methyl iodide. The enzyme AST N-acetyltransferase (ArsN1) was utilized to purify L-AST from racemic AST. This expedient chemical synthesis of AST provides a source of this novel antibiotic for future drug development.

20 Claims, 28 Drawing Sheets

CHEMICAL SYNTHESIS OF THE ORGANOARSENICAL ANTIBIOTIC ARSINOTHRICIN

CROSS REFERENCE TO RELATED APPLICATIONS

This application is a Divisional Application of U.S. application Ser. No. 17/363,993, filed Jun. 30, 2021, which is incorporated herein by reference in their entirety.

GOVERNMENT SUPPORT

This invention was made with government support under GM055425 and GM136211 awarded by the National Institutes of Health. The government has certain rights in the invention.

BACKGROUND OF THE INVENTION

Arsenic has been utilized therapeutically since the Eras of Ancient Greece and China. Numerous arsenic species including organoarsenic compounds present in the environment are used in treatment of number of human diseases and are biotransformed in microbes and animals, including humans.

Synthesis of organoarsenic compounds is crucial to characterize arsenic species produced by arsenic biotransformations. A variety of synthetic protocols are being developed to make novel organoarsenicals. For example, the structures of new aromatic arsenical metabolites discovered in chicken liver were confirmed by chemical synthesis.

An arsenic-containing compound, arsinothricin [2-amino-4-(hydroxymethylarsinoyl)butanoic acid or AST (1)], is produced by the rice rhizosphere bacterium *Burkholderia gladioli* GSRB05. The natural product AST has broad-spectrum antibiotic activity and is effective against both Gram-positive and Gram-negative bacteria, including one of the World Health Organization priority pathogens carbapenem-resistant *Enterobacter cloacae* (CRE), and *Mycobacterium bovis* BCG, a causative agent of tuberculosis in animals and humans that is closely related to the human pathogen *Mycobacterium tuberculosis* (MTB).

AST is a nonproteogenic amino acid analog of glutamate that inhibits bacterial glutamine synthetase (GS), a crucial enzyme in the biosynthesis of natural products containing nitrogen, presumably by mimicking the γ-acylphosphoglutamate intermediate in the glutamine synthetase reaction.

AST and related arsenic-containing compounds may be the progenitors of a new class of antibiotics. They may prove to be more effective as drugs than chemically related phosphonates, including some of the most effective commercially available herbicides, pesticides and human drugs.

While modest amounts of AST can be generated using the source organism, drug development requires a reliable source of the compound. The amounts of AST produced by the source organism are insufficient for further biochemical and clinical characterization of this antibiotic. Overcoming this obstacle requires a chemical synthetic process.

Thus, there is a need to develop novel methods for synthesizing AST and derivatives, ultimately, at a large scale, for animal testing, clinical trials and further drug development.

BRIEF SUMMARY OF THE INVENTION

The subject invention provides methods and procedures for synthesis of the antibiotic AST. Advantageously, the methods and procedures of the subject invention can reduce effort and complexities associated with production of pure AST from either bacterial culture medium or enzymatic buffer and to provide a reliable source of larger quantities of AST for future drug development. Enzymatic separation of AST enantiomers is also described.

In one embodiment, the subject invention provides methods for the chemical synthesis of racemic AST. One is by condensation of 2-chloroethyl(methyl)arsinic acid with acetamidomalonate, and the second involves reduction of an N-acetyl-protected derivative of hydroxyarsinothricin (AST-OH) and subsequent methylation of the resulting sodium salt of trivalent arsenic intermediate with methyl iodide.

The enzyme AST N-acetyltransferase (ArsN1) was utilized to purify L-AST from racemic AST. This convenient chemical synthesis can be scaled up to gram quantities to produce AST in sufficient amounts for further drug development.

In one embodiment, the subject invention provides a method for synthesizing racemic arsinothricin (D,L-AST), the method comprising mixing an arsenic precursor with a malonate compound in the presence of a base; and adding an acid. In a specific embodiment, the arsenic precursor is 2-chloroethyl(methyl)arsinic acid; the malonate compound is acetamidomalonate; the base is sodium ethoxide; and the acid is HCl.

In one embodiment, the subject invention provides a method for synthesizing racemic arsinothricin (D,L-AST) comprising: mixing an arsenic precursor comprising a primary alcohol with a halogen donor; adding a malonate compound with a base; and adding an acid. In a specific embodiment, the arsenic precursor is 2-hydroxyethyl (methyl)arsinic acid; the malonate compound is acetamidomalonate; the base is sodium ethoxide; the acid is HCl; and the halogen donor is TMSCl or $SOCl_2$.

In one embodiment, the subject invention provides a method for chemically synthesizing racemic arsinothricin (D,L-AST), the method comprising mixing a pentavalent N-acetyl protected analogue of AST-OH with a reducing agent to reduce the pentavalent N-acetyl protected analogue of AST-OH to form a trivalent arsine compound; and mixing the trivalent arsine compound with a alkylation reagent. In a specific embodiment, the N-acetyl protected analogue of AST-OH is ethyl-2-acetamido-2-ethoxycarbonyl-4-(hydroxymethylarsinoyl)butanoate; the reducing agent is $SO_2$ in a mixture with a catalytic agent and an acid; and the alkylation reagent is methyl iodide.

In one embodiment, the synthesized AST comprises a mixture of D-AST and L-AST.

In one embodiment, the method of the subject invention further comprises mixing the synthesized D,L-AST with an ArsN1 and acetyl coenzyme A (AcCoA) to produce a mixture of D-AST and L-N-acetyl-AST (L-N-Ac-AST); separating D-AST from L-N-Ac-AST; deacetylating L-N-Ac-AST to provide purified L-AST.

DETAILED DESCRIPTION OF THE INVENTION

The subject invention provides methods and procedures for chemical synthesis of the antibiotic arsinothricin (AST), and derivatives and enantiomers thereof. Provided by the subject invention are straightforward protocols for the synthesis of racemic AST by chemical methods. The chemical synthesis of the subject invention can be scaled up to gram quantities to produce AST in sufficient amounts for further drug development. In a preferred embodiment, the chemical synthesis of AST does not involve enzymatical reaction conversion of AST from any precursors.

AST is a broad-spectrum organoarsenical antibiotic that is effective against both Gram-positive and Gram-negative bacteria. AST is an amino acid analog of glutamate in which a gamma carboxylic acid group is replaced by a hydroxymethylarsinoyl group. AST is potent inhibitor of glutamine synthetase (GS).

Figure 1:
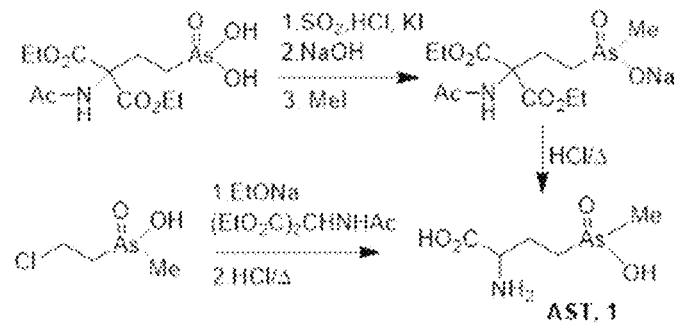
FIG. 1 shows the chemical synthesis of AST (1).

In one embodiment, the method of the subject invention involves condensation of 2-chloroethyl(methyl)arsinic acid with diethyl acetamidomalonate (FIG. 1).

In one embodiment, the method for chemical synthesis of AST comprises:

1) providing an arsenic precursor comprising a primary alcohol (primary —OH), preferably, the precursor being pentavalent 2-hydroxyethyl(methyl)arsinic acid 5;

2) converting the primary alcohol to an alkyl halide by mixing/contacting the precursor with one or more halogen donors;

3) adding a malonate compound, e.g., diethyl acetamidomalonate, to the mixture of 2); and 4) obtaining synthetic AST by the deprotection and decarboxylation of the product of 3) via reflux.

In one embodiment, the conversion step comprises contacting the precursor with a chloride donor, such as $SOCl_2$ and TMSCl to convert the primary alcohol of the precursor to chloride. In a specific embodiment, the method comprises contacting 2-hydroxyethyl(methyl)arsinic acid 5 with $SOCl_2$ or TMSCl to afford 2-chloroethyl(methyl)arsinic acid 7.

In one embodiment, the malonate compound comprises an N-acetyl protected primary or secondary amine. In one embodiment, the malonate compound can be an ester of malonic acids. In a specific embodiment, the malonate compound is, for example, diethyl acetamidomalonate or dimethyl acetamidomalonate. In one embodiment, mixing the malonate compound, e.g., diethyl acetamidomelonate or dimethyl acetamidomalonate, with the alkyl halide leads to the alkylation of the malonate compound, e.g., acetamidomelonate. In a preferred embodiment, such alkylation occurs in the presence of a base, e.g., sodium ethoxide, and sodium methoxide. Specifically, mixing acetamidomelonate with 2-chloroethyl(methyl)arsinic acid 7 affords melonate 8.

In on embodiment, the malonate compound is an aminomalonate reagent. In a further embodiment, the amino group in the aminomelonate reagent is protected by a functional group, for example, alkyl or substituted alkyl, acyl (e.g., acetyl) or substituted acyl, and aryl, or substituted aryl.

In a preferred embodiment, the malonate compound is diethyl acetamidomelonate. The alkylation of diethyl acetamidomelonate occurs in the presence of sodium ethoxide. This step may occur at an elevated temperature, for example, from about 40 to about 90° C., from about 50 to about 90° C., from about 50 to about 80° C., from about 60 to about 80° C., or from about 60 to about 70° C., preferably at about 50° C., 60° C., 70° C., 80° C., or 90° C., or any temperature therebetween.

In one embodiment, the malonate compound is dimethyl acetamidomelonate. The alkylation of dimethyl acetamidomalonate can occur in the presence of sodium methoxide. This step may occur at an elevated temperature, for example, from about 40 to about 90° C., from about 50 to about 90° C., from about 50 to about 80° C., from about 60 to about 80° C., or from about 60 to about 70° C., preferably at about 50° C., 60° C., 70° C., 80° C., or 90° C., or any temperature therebetween.

In one embodiment, the step of deprotection and decarboxylation of the product of step 3) comprises adding an acid to the product of step 3). The acid can be selected from, e.g., HCl, $H_2SO_4$, and $HNO_3$. In a specific embodiment, the deprotection and decarboxylation of melonate 8 occurs in the presence of an acid, e.g., HCl. In a preferred embodiment, the acid has a concentration from 1 M to 20 M, 1 M to 15 M, 1 M to 10 M, 2 M to 10 M, 2 M to 8 M, or 4 M to 8 M, more preferably, a concentration of 2 M, 3 M, 4 M, 5 M, 6 M, 7 M, 8 M, 9 M, or 10 M, or any concentration therebetween.

In one embodiment, the yield of each step in the synthesis method according to the subject invention is at least 5%, 10%, 15%, 20%, 25%, 30%, 35%, 40%, 45%, 50%, 55%, 60%, 65%, 70%, 75%, 80%, 85%, 90%, 95%, 98%, or 99%.

In one embodiment, the method for chemical synthesis of AST comprises:

providing an arsenic precursor comprising a primary alcohol (primary —OH), preferably, the precursor being pentavalent 2-hydroxyethyl(methyl)arsinic acid 5;

mixing/contacting the arsenic precursor with one or more halogen donors to form 2-chloroethyl(methyl)arsinic acid 7;

adding a malonate compound, e.g., acetamidomalonate, preferably in the presence of a base, e.g., sodium ethoxide, to yield malonate 8; and adding an acid, e.g., HCl, to produce AST.

In one embodiment, the method for chemical synthesis of AST comprises mixing an arsenic precursor comprising a primary alcohol (primary —OH) with a malonate compound, e.g., acetamidomalonate, preferably, the precursor being 2-chloroethyl(methyl)arsinic acid 7; and obtaining synthetic AST by the deprotection and decarboxylation of the product of the mixing step, via reflux.

In one embodiment, the method for chemical synthesis of AST comprises: providing an arsenic precursor comprising a primary alcohol (primary —OH), preferably, the precursor being 2-chloroethyl(methyl)arsinic acid 7; adding a malonate compound, e.g., acetamidomalonate, preferably in the presence of sodium ethoxide to yield malonate 8; and adding an acid, e.g., HCl, to produce AST.

In one embodiment, the subject invention provides a method for chemical synthesis of AST via direct methylation of AST-OH, the method comprising mixing AST-OH with a reducing agent, or a mixture of reducing agents, to reduce the pentavalent AST-OH to form a trivalent arsine compound; and mixing the trivalent arsine compound with an alkylation reagent.

In one embodiment, the step of reducing the pentavalent AST-OH to form a trivalent arsine compound comprises mixing the pentavalent AST-OH with a reducing agent, wherein the mixture of the pentavalent AST-OH and the reducing agent may further comprise a catalytic agent and an acid. In a preferred embodiment, the reducing agent is $SO_2$, the catalytic agent is KI and the acid is HCl. The mixture has a pH value of 1-6.5, 1.5-6, 2-6, 2-5.5, 2-5, 2-4, 2-3, 2.5-5.5, 3-5.5, 3.5-5.5, 4-5.5, 4-5, or 4-6. The reaction can be performed at room temperature.

In a preferred embodiment, the step of reducing the pentavalent AST-OH to form a trivalent arsine compound comprises mixing AST-OH with KI, HCl and $SO_2$ followed by treatment with an alkaline solution, e.g., NaOH, and KOH, to form a trivalent arsine compound, e.g., a trivalent arsine salt.

In a preferred embodiment, the alkylation reagent is methyl iodide (MeI). In a preferred embodiment, the alkylation reagent is provided at an excess amount for the alkylation.

In one embodiment, the subject invention also provides a method for chemically synthesizing AST that comprises the reduction of the N-acetyl protected analogue of AST-OH and subsequent methylation of the resulting trivalent arsenic intermediate with methyl iodide (FIG. 1). In a specific embodiment, the N-acetyl protected analogue of AST-OH is ethyl-2-Acetamido-2-ethoxycarbonyl-4-(hydroxymethylarsinoyl)butanoate (11).

In one embodiment, the method comprises a) mixing an N-acetyl protected analogue of AST-OH with a reducing agent or a mixture of reducing agents to reduce the pentavalent AST-OH to form a trivalent arsine compound; b) mixing the trivalent arsine compound with an alkylation reagent; and c) obtaining synthetic AST by the deprotection and decarboxylation of the product of b).

In a specific embodiment, the reducing agent is $SO_2$, and the mixture of reducing agents comprises a catalytic agent, e.g., KI, and an acid, e.g., HCl. The mixture may have a pH value of 1-6.5, 1.5-6, 2-6, 2-5.5, 2-5, 2-4, 2-3, 2.5-5.5, 3-5.5, 3.5-5.5, 4-5.5, 4-5, or 4-6. The reaction can be performed at room temperature.

In a preferred embodiment, the method further comprises treating the product of a) with an alkaline solution, e.g., NaOH, and KOH prior to the step b) to form a trivalent arsine compound, e.g., a trivalent arsine salt. In a specific embodiment, the alkylation reagent is MeI. In a preferred embodiment, the alkylation reagent is provided at an excess amount for the alkylation.

In one embodiment, the step of deprotection and decarboxylation of the product of step c) comprises adding an acid to the product of step b). The acid can be selected from, e.g., HCl, $H_2SO_4$, and $HNO_3$. In one embodiment, the acid has a concentration from 1 M to 20 M, 1 M to 15 M, 1 M to 10 M, 2 M to 10 M, 2 M to 8 M, or 4 M to 8 M, more preferably, a concentration of 2 M, 3 M, 4 M, 5 M, 6 M, 7 M, 8 M, 9 M, or 10 M, or any concentration therebetween.

In one embodiment, the yield of each step in the synthesis method according to the subject invention is at least 5%, 10%, 15%, 20%, 25%, 30%, 35%, 40%, 45%, 50%, 55%, 60%, 65%, 70%, 75%, 80%, 85%, 90%, 95%, 98%, or 99%.

In one embodiment, the method for chemically synthesizing AST comprises:

mixing ethyl-2-Acetamido-2-ethoxycarbonyl-4-(hydroxymethylarsinoyl)butanoate 11 with a reducing agent followed by the treatment with an alkaline solution;

adding an alkylation reagent, e.g., MeI, to yield malonate 8, preferably, the alkylation reagent is provided at an excess amount for the alkylation; and adding an acid, e.g., HCl, to produce AST.

In a specific embodiment, the reducing agent is $SO_2$, and the alkaline solution is, e.g., NaOH, and KOH. In a preferred embodiment, the reducing agent is combined with a catalytic agent, e.g., KI, and an acid, e.g., HCl. In one embodiment, the acid has a concentration from 1 M to 20 M, 1 M to 15 M, 1 M to 10 M, 2 M to 10 M, 2 M to 8 M, or 4 M to 8 M, more preferably, a concentration of 2 M, 3 M, 4 M, 5 M, 6 M, 7 M, 8 M, 9M, or 10 M, or any concentration therebetween.

In one embodiment, the method of the subject invention furthers comprises a step of purifying the obtained AST. Purification methods are known in the art. For example, AST synthesized according to the subject invention can be purified by cation exchange chromatography.

In one embodiment, the obtained AST may be a mixture of the D/L-enantiomers.

In one embodiment, the method of the subject invention further comprises a step of purifying L-AST from the mixture of the D/L-AST enantiomers. In one embodiment, such purification comprises incubating the obtained AST, or the mixture of D/L-AST with an ArsN1 enzyme in the presence of AcCoA to produce a mixture of D-AST and L-N-Ac-AST; separating D-AST and L-N-Ac-AST; deacetylating L-N-Ac-AST and purifying L-AST via reflux in an acid, e.g., HCl.

In one embodiment, the step for purifying L-AST from the obtained AST is via enzymatic separation by enantioselective acetylation with ArsN1, preferably, PpArsN1 (ArsN1 from *Pseudomonas putida* KT2440). ArsN1, the bacterial enzyme that confers AST resistance, catalyzes the transfer of the acetyl group of acetyl coenzyme A (AcCoA) to the amine group of AST 1, generating L-N-acetyl-AST (L-N-Ac-AST, 13).

In one embodiment, the subject invention provides a composition comprising AST (D,L-AST) synthesized and purified by the method of the subject invention, or salts thereof, and a pharmaceutically acceptable carrier. In a specific embodiment, the composition comprises pure L-AST according to the subject invention, or salts thereof, and a pharmaceutically acceptable carrier.

The "salts" can be with an inorganic acid, such as hydrochloric acid, hydrobromic acid, perchloric acid, nitric acid, thiocyanic acid, sulfuric acid, and phosphoric acid; an organic acid, such as trifluoroacetic acid (TFA), formic acid, acetic acid, propionic acid, glycolic acid, lactic acid, pyruvic acid, oxalic acid, malonic acid, succinic acid, maleic acid, and fumaric acid; or a salt with a base, such as sodium hydroxide, ammonium hydroxide, potassium hydroxide, and organic bases such as mono-, di-, trialkyl and aryl amines, and substituted ethanolamines.

Further salts include: (1) acid addition salts, formed with inorganic acids such as sulfuric acid, nitric acid, phosphoric acid, and the like; or formed with organic acids such as acetic acid, propionic acid, hexanoic acid, cyclopentanepropionic acid, glycolic acid, pyruvic acid, lactic acid, malonic acid, succinic acid, malic acid, maleic acid, fumaric acid, tartaric acid, citric acid, benzoic acid, 3-(4-hydroxybenzoyl) benzoic acid, cinnamic acid, mandelic acid, methanesulfonic acid, ethanesulfonic acid, 1,2-ethane-di sulfonic acid, 2-hydroxyethanesulfonic acid, benzenesulfonic acid, 4-chlorobenzenesulfonic acid, 2-naphthalenesulfonic acid, 4-toluenesulfonic acid, camphorsulfonic acid, 4-methylbicyclo [2.2.2]-oct-2-ene-1-carboxylic acid, glucoheptonic acid, 3-phenylpropionic acid, trimethylacetic acid, tertiary butylacetic acid, lauryl sulfuric acid, gluconic acid, glutamic acid, hydroxynaphthoic acid, salicylic acid, stearic acid, muconic acid, and the like; or (2) salts formed when an acidic proton present in AST, derivatives, or salts thereof is either replaced by a metal ion, e.g., an alkali metal ion, an alkaline earth ion, a selenium ion or an aluminum ion; or coordinates with an organic base such as ethanolamine, diethanolamine, triethanolamine, N-methylglucamine and the like. Salts further include, by way of example only, sodium, potassium, calcium, magnesium, ammonium, tetraalkylammonium, and the like.

"Pharmaceutically acceptable carrier" or "pharmaceutically acceptable excipient" includes any and all inert, biologically-compatible carriers, as well as solvents, dispersion media, coatings, antibacterial and antifungal agents, isotonic, and absorption delaying agents, and the like. The use of such media and agents for pharmaceutically active substances is well known in the art. Except insofar as any conventional media or agent is incompatible with the active ingredient, its use in the therapeutic compositions of the invention is contemplated. Supplementary active ingredients can also be incorporated into the compositions.

In certain embodiments, the composition of the subject invention comprising D,L-AST, L-AST, or salt thereof, may be administered intramuscularly, subcutaneously, intrathecally, intravenously or intraperitoneally by infusion or injection. Solutions of D,L-AST, L-AST, or salt thereof, can be prepared in water, optionally mixed with a nontoxic surfactant. Under ordinary conditions of storage and use, these preparations can contain a preservative to prevent the growth of microorganisms.

The pharmaceutical dosage forms suitable for injection or infusion can include sterile aqueous solutions or dispersions or sterile powders comprising D,L-AST, L-AST, or salt thereof, which are adapted for the extemporaneous preparation of sterile injectable or infusible solutions or dispersions, optionally encapsulated in liposomes. Preferably, the ultimate dosage form should be sterile, fluid, and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof.

In one embodiment, it will be preferable to include isotonic agents, for example, sugars, buffers, or sodium chloride. Prolonged absorption of the injectable compositions can be brought about by the use in the compositions of agents delaying absorption, for example, aluminum monostearate and gelatin.

Sterile injectable solutions are prepared by incorporating D,L-AST, L-AST, or a salt thereof, in the required amount in the appropriate solvent and with various of the other ingredients, as desired, preferably followed by filter sterilization. In the case of sterile powders for the preparation of sterile injectable solutions, the preferred methods of preparation are vacuum drying and freeze drying techniques, which yield a powder of D,L-AST, L-AST, or salt thereof, plus any additional desired ingredient present in the previously sterile-filtered solutions.

The compositions of the subject invention may also be administered orally, in combination with a pharmaceutically acceptable vehicle such as an inert diluent or an assimilable edible carrier. They may be enclosed in hard or soft shell gelatin capsules, or may be compressed into tablets.

For oral therapeutic administration, D,L-AST, L-AST, or a salt thereof, may be combined with one or more excipients and used in the form of ingestible tablets, buccal tablets, troches, capsules, elixirs, suspensions, syrups, wafers, and the like. Such compositions and preparations should contain at least 0.1% of D,L-AST, L-AST, or salts thereof, of the present invention. The percentage of D,L-AST, L-AST, or salts thereof, present in such compositions and preparations may be varied and may conveniently be between about 1% to about 60% of the weight of a given unit dosage form. The amount of D,L-AST, L-AST, or salts thereof, in such therapeutically useful compositions is such that an effective dosage level will be obtained. When the unit dosage form is a capsule, it may contain, in addition to materials of the above type, a liquid carrier, such as a vegetable oil or a polyethylene glycol.

Various other materials may be present as coatings or for otherwise modifying the physical form of the unit dosage form. For instance, tablets, pills, or capsules may be coated with gelatin, wax, shellac, or sugar, and the like. Any material used in preparing any unit dosage form should be pharmaceutically acceptable and substantially non-toxic in the amounts employed.

Pharmaceutical compositions for topical administration of D,L-AST, L-AST, or salts thereof, to the epidermis (mucosal or cutaneous surfaces) can be formulated as, for example, ointments, creams, lotions, gels, or as a transdermal patch. Such transdermal patches can contain penetration enhancers such as linalool, carvacrol, thymol, citral, menthol, t-anethole, and the like. Ointments and creams can, for example, include an aqueous or oily base with the addition of suitable thickening agents, gelling agents, colorants, and the like. Lotions and creams can include an aqueous or oily base and typically also contain one or more emulsifying agents, stabilizing agents, dispersing agents, suspending agents, thickening agents, coloring agents, and the like. Gels preferably include an aqueous carrier base and include a gelling agent such as cross-linked polyacrylic acid polymer, a derivatized polysaccharide (e.g., carboxymethyl cellulose), and the like.

Useful solid carriers include finely divided solids such as talc, clay, microcrystalline cellulose, silica, alumina, and the like. Other solid carriers include nontoxic polymeric nanoparticles or microparticles. Useful liquid carriers include water, alcohols, or glycols, or water/alcohol/glycol blends, in which D,L-AST, L-AST, or salts thereof can be dissolved or dispersed at effective levels, optionally with the aid of non-toxic surfactants. Adjuvants such as fragrances and additional antimicrobial agents can be added to optimize the properties for a given use. The resultant liquid compositions can be applied from absorbent pads, used to impregnate bandages and other dressings, or sprayed onto the affected area using pump-type or aerosol sprayers.

The concentration of D,L-AST, L-AST, or salts thereof in such formulations can vary widely depending on the nature of the formulation and intended route of administration. For example, the concentration of D,L-AST, L-AST, or salts thereof, in a liquid composition, such as a lotion, can preferably be from about 0.1-25% by weight, or, more preferably, from about 0.5-10% by weight. The concentration in a semi-solid or solid composition such as a gel or a powder can preferably be about 0.1-5% by weight, or, more preferably, about 0.5-2.5% by weight.

Pharmaceutical compositions for spinal administration or injection into amniotic fluid can be provided in unit dose form in ampoules, pre-filled syringes, small volume infusion, or in multi-dose containers, and can include an added preservative. The compositions for parenteral administration can be, for example, suspensions, solutions, or emulsions, and can contain excipients such as suspending agents, stabilizing agents, and dispersing agents.

Pharmaceutical compositions suitable for intra-nasal administration are also encompassed by the present invention. Such intra-nasal compositions comprise D,L-AST, L-AST, or salt thereof, in a vehicle and, preferably, a suitable administration device to deliver a liquid spray, dispersible powder, or drops. Drops may be formulated with an aqueous or non-aqueous base also comprising one or more dispersing agents, solubilizing agents, and/or suspending agents. Liquid sprays are conveniently delivered from a pressurized pack, an insufflator, a nebulizer, or other convenient means of delivering an aerosol comprising D,L-AST, L-AST, or salt thereof. Pressurized packs comprise a suitable propellant such as dichlorodifluoromethane, trichlorofluoromethane, dichlorotetrafluoroethane, carbon dioxide, or other suitable gas as is well known in the art. Aerosol dosages can be controlled by providing a valve to deliver a metered amount of D,L-AST, L-AST, or salts thereof.

Pharmaceutical compositions for administration by inhalation or insufflation can be provided in the form of a dry powder composition, for example, a powder mix of D,L-AST, L-AST, or salts thereof, and a suitable powder base such as lactose or starch. Such powder composition can be provided in unit dosage form, for example, in capsules, cartridges, gelatin packs, or blister packs, from which the powder can be administered with the aid of an inhalator or insufflator.

The exact amount (effective dose) of D,L-AST, L-AST, or salts thereof, can vary from subject to subject, depending on, for example, the species, age, weight, and general or clinical condition of the subject, the severity or mechanism of any disorder being treated, the particular agent or vehicle used, the method and scheduling of administration, and the like. A therapeutically effective dose can be determined empirically, by conventional procedures known to those of skill in the art. See, e.g., The Pharmacological Basis of Therapeutics, Goodman and Gilman, eds., Macmillan Publishing Co., New York. For example, an effective dose can be estimated initially either in cell culture assays or in suitable animal models. The animal model may also be used to determine the appropriate concentration ranges and routes of administration. Such information can then be used to determine useful doses and routes for administration in humans.

The particular mode of administration and the dosage regimen will be selected by the attending clinician, taking into account the particulars of the case (e.g., the subject, the disease, the disease state involved, and whether the treatment is prophylactic). Treatment may involve daily or multi-daily doses of compound(s) over a period of a few days to months, or even years.

In general, however, a suitable dose will be in the range of from about 0.001 to about 100 mg/kg of body weight per day, preferably from about 0.01 to about 100 mg/kg of body weight per day, more preferably, from about 0.1 to about 50 mg/kg of body weight per day, or even more preferred, in a range of from about 1 to about 10 mg/kg of body weight per day. For example, a suitable dose may be about 1 mg/kg, 10 mg/kg, or 50 mg/kg of body weight per day, or any dose therebetween.

L-AST, D,L-AST, or salts thereof, can be conveniently administered in unit dosage form, containing for example, about 0.05 to about 10000 mg, about 0.5 to about 10000 mg, about 5 to about 1000 mg, or about 50 to about 500 mg of each of D,L-AST, L-AST, or salts thereof.

L-AST, D,L-AST, or salts thereof, can be administered to achieve peak plasma concentrations of, for example, from about 0.25 to about 200 µM, about 0.5 to about 75 µM, about 1 to about 50 µM, about 2 to about 30 µM, or about 5 to about 25 µM of each of D,L-AST, L-AST, or salts thereof per unit dosage form. Exemplary desirable plasma concentrations include at least 0.25, 0.5, 1, 5, 10, 25, 50, 75, 100 or 200 µM. For example, plasma levels may be from about 1 to about 100 micromolar or from about 10 to about 25 micromolar. This may be achieved, for example, by the intravenous injection of a 0.05 to 5% solution of D,L-AST, L-AST, or salts thereof, optionally in saline, or orally administered as a bolus containing about 1 to about 100 mg of D,L-AST, L-AST, or salts thereof. Desirable blood levels may be maintained by continuous or intermittent infusion.

L-AST, D,L-AST, or salts thereof, can be included in the compositions within a therapeutically useful and effective concentration range, as determined by routine methods that are well known in the medical and pharmaceutical arts. For example, a typical composition can include D,L-AST, L-AST, or salts thereof, at a concentration in the range of at least about 1 mg/ml, preferably at least about 4 mg/ml, more preferably at least 5 mg/ml and most preferably at least 6 mg/ml of each of D,L-AST, L-AST, or salts thereof.

L-AST, D,L-AST, or salts thereof, may conveniently be presented in a single dose or as divided doses administered at appropriate intervals, for example, as one dose per day or as two, three, four or more sub-doses per day. The sub-dose itself may be further divided, e.g., into a number of discrete loosely spaced administrations; such as multiple inhalations from an insufflator.

Optionally, the pharmaceutical compositions of the present invention can include one or more other therapeutic agents, e.g., as a combination therapy. The additional therapeutic agent(s) will be included in the compositions within a therapeutically useful and effective concentration range, as determined by routine methods that are well known in the medical and pharmaceutical arts. The concentration of any particular additional therapeutic agent may be in the same range as is typical for use of that agent as a monotherapy, or the concentration may be lower than a typical monotherapy concentration if there is a synergy when combined with D,L-AST, L-AST, or salts thereof.

Certain embodiments of the subject invention provide methods of treating an infection in a subject caused by an infectious agent, the method comprising administering to the subject purified L-AST or AST obtained by the methods of the subject invention or the composition of the subject invention.

"Subject" refers to an animal, such as a mammal, for example a human. The methods described herein can be useful in both pre-clinical human therapeutics and veterinary applications. In some embodiments, the subject is a mammal (such as an animal model of disease), and in some embodiments, the subject is human. Non-limiting examples of subjects include canine, porcine, rodent, feline, bovine, poultry, equine, human, and a non-human primate.

The term "treatment" or any grammatical variation thereof (e.g., treat, treating, etc.), as used herein, includes but is not limited to, the application or administration to a subject (or application or administration to a cell or tissue from a subject) with the purpose of delaying, slowing, stabilizing, curing, healing, alleviating, relieving, altering, remedying, less worsening, ameliorating, improving, or affecting the disease or condition, the symptom of the disease or condition, or the risk of (or susceptibility to) the disease or condition. The term "treating" refers to any indication of success in the treatment or amelioration of a pathology or condition, including any objective or subjective parameter such as abatement; remission; lessening of the rate of worsening; lessening severity of the disease; stabilization, diminishing of symptoms or making the pathology or condition more tolerable to the subject; or improving a subject's physical or mental well-being.

The infectious agent can be a bacterium, protozoan, helminth, archaebacterial, or a fungus. Preferably, the infectious agent expresses glutamine synthetase. The bacterium can be Gram-positive or Gran-negative. Non-limiting examples of bacterial infections that can be treated according to the methods of the invention include infections caused by *Burkolderia* spp., *Sinorhizobium* spp., *Schewanella* spp., *Bacillus* spp., *Corynebacterium* spp., *Mycobacterium* spp., and *Enterobacter* spp. Specific bacterial species include *Burkolderia gladioli*, *Sinorhizobium meliloti*, *Schewanella putrefaciens*, *Bacillus cereus*, *Bacillus megaterium*, *Corynebacterium glutamicum*, *Mycobacterium bovis*, *Mycobacterium tuberculosis*, and *Enterobacter cloacae*.

In preferred embodiments the invention provides methods of treating an infection caused by *Mycobacterium tuberculosis*, *Mycobacterium bovis*, or carbapenem-resistant *Enterobacter cloacae*. In other preferred embodiments, the invention provides methods of treating an infection caused by carbapenem-resistant *Acinetobacter baumannii*, carbapenem-resistant *Pseudomonas aeruginosa*, carbapenem-resistant Enterobacteriaceae (including *Enterobacter cloacae*), vancomycin-resistant *Enterococcus faecium*, methicillin- and/or vancomycin-resistant *Staphylococcus aureus*, clarithromycin-resistant *Helicobacter pylori*, fluoroquinolone-resistant *Campylobacter* spp., fluoroquinolone-resistant Salmonellae, cephalosporin and/or fluoroquinolone-resistant *Neisseria gonorrhoeae*, penicillin-non-susceptible *Streptococcus pneumoniae*, ampicillin-resistant *Haemophilus influenzae*, fluoroquinolone-resistant *Shigella* spp. or carbapenem-resistant *Enterobacter cloacae*.

Further embodiments of the invention provide a method of killing or inhibiting the growth of an infectious agent, the method comprising contacting the infectious agent with an effective amount of D,L-AST, L-AST, or salts thereof. Specific infectious agents discussed in connection with the methods of treating infections in a subject can be killed or inhibited according to the methods disclosed herein.

As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." The transitional terms/phrases (and any grammatical variations thereof) "comprising," "comprises," and "comprise" can be used interchangeably; "consisting essentially of," and "consists essentially of" can be used interchangeably; and "consisting," and "consists" can be used interchangeably.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 0-20%, 0 to 10%, 0 to 5%, or up to 1% of a given value. Where particular values are described in the application and claims, unless otherwise stated the term "about" meaning within an acceptable error range for the particular value should be assumed.

When ranges are used herein, such as for dose ranges, combinations and subcombinations of ranges (e.g., sub-ranges within the disclosed range), specific embodiments therein are intended to be explicitly included.

EXAMPLES

Materials and Methods
Synthetic Procedures and Characterization Data for Compounds General Information. $^1$H NMR spectra at 400 MHz and $^{13}$C NMR at 100.6 MHz were recorded in $D_2O$ unless otherwise noted. All chemical shift values are reported in parts per million (ppm) and referenced to the residual solvent peaks of DMSO-$d_6$ (2.5 ppm), CDCl$_3$ (7.26) and $D_2O$ (4.79 ppm) for $^1$H NMR and the DMSO-$d_6$ (39.52 ppm) or CDCl$_3$ (77.16) peaks for $^{13}$C NMR spectra, with coupling constant (J) values reported in Hz. HRMS were obtained in TOF (ESI) negative or positive mode. TLC was performed on Merck Kieselgel 60-$F_{254}$, and products were detected by staining with 1% ninhydrin solution. Merck Kieselgel 60 (230-400 mesh) was used for column chromatography. All reagents and solvents were purchased from commercial suppliers and used without further purification.

Figure 2A:
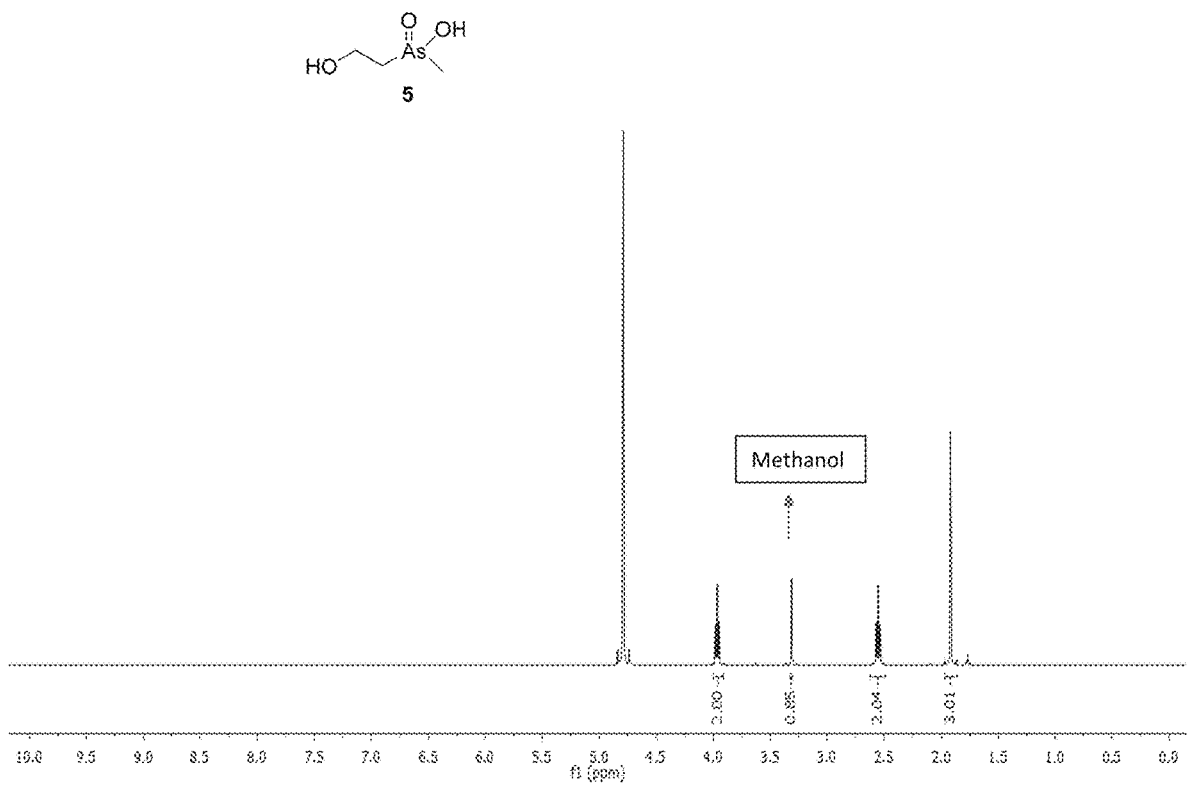
FIGS. 2A-2B show the $^1H$ NMR (A) and $^{13}C$ NMR (B) spectra of compound 5.
Figure 2B:
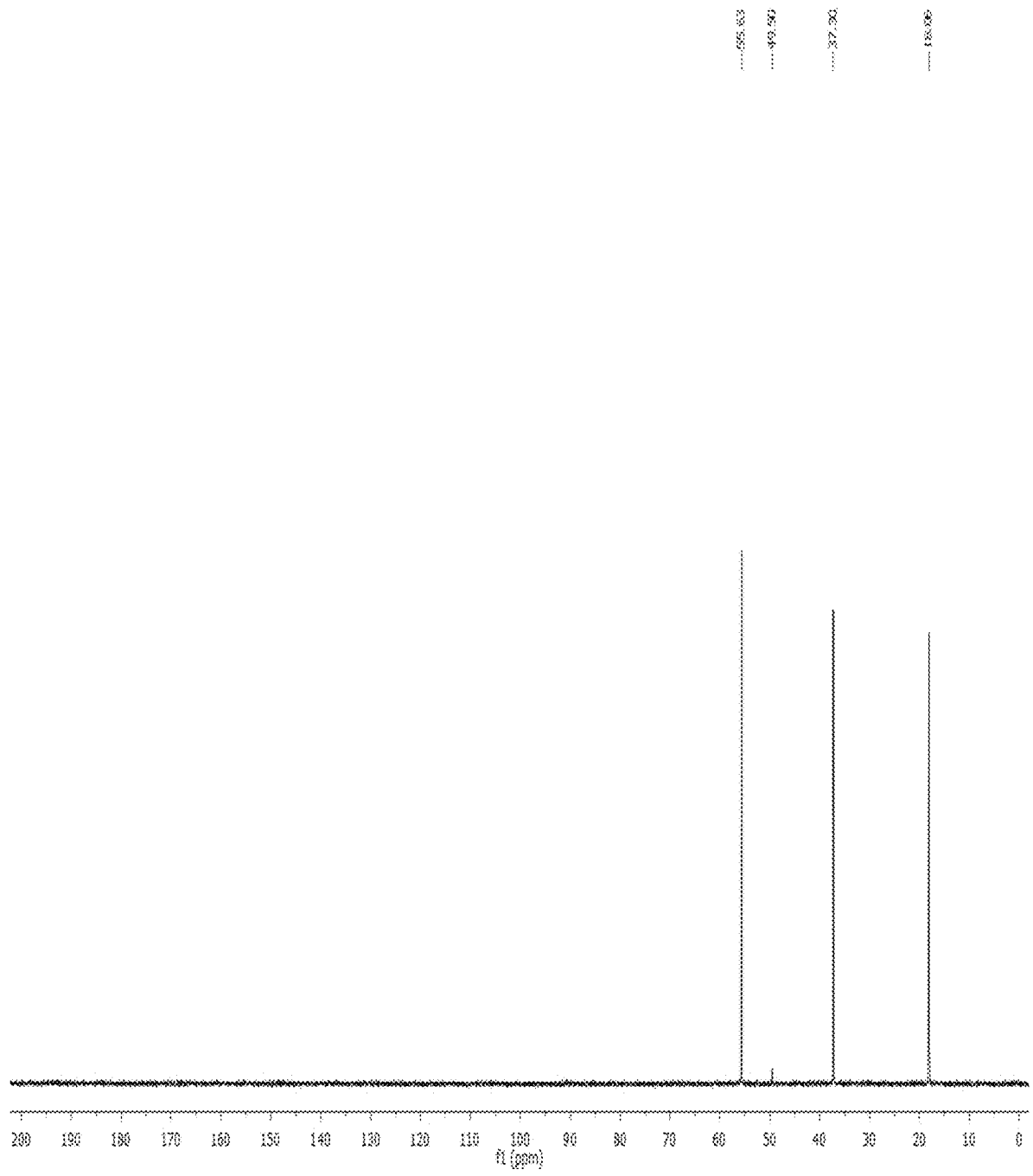

2-Hydroxyethyl(methyl)arsinic acid (5). (a) Preparation of diiodo(methyl)arsine ($MeAsI_2$). A solution of KI (41.5 g, 0.252 mol) in $H_2O$ (40 mL) was added into the solution of monosodium salt of the commercially available methylarsonate ($CH_3As(O)(OH)ONa$; 0.126 mol, 3.15 M/$H_2O$, 40 mL). Conc. HCl (30 mL) was slowly added into the mixtures with continuous stirring. Then $SO_2$ gas was passed into the mixtures for 30 min. The resulting mixture was extracted with $CH_2Cl_2$ (3×70 mL) and dried over anhydrous $Na_2SO_4$. The volatiles were evaporated to afford $MeAsI_2$ (46 g, 97%) as orange liquid. (b) Condensation with 2-chloroethanol. 12 M aqueous NaOH (40 mL, 19.2 g, 0.48 mol) was slowly added into $MeAsI_2$ (46 g, 0.122 mol) placed in a round bottom flask (0° C., ice bath) over a 20 min with vigorous stirring. During the addition of NaOH, the yellow color was disappeared resulting in colorless solution. The resulting $CH_3As(ONa)_2$ solution was stirred for 15 min and then 2-chloroethanol (3a; 8.2 mL, 9.8 g, 0.122 mol) was slowly added over 10 min. The mixture was allowed to warm to ambient temperature (approximately 1 h) and stirring was continued for 12 h. The mixture was acidified with 6 M HCl to pH~4 and white precipitate was filtered out. The filtrate was evaporated at reduced pressure yielding a white solid, which was suspended in MeOH. The white precipitate was removed by vacuum filtration and the mother liquor was evaporated at reduced pressure to give 5 (19.9 g, 86%) as a white solid: $^1H$ NMR ($D_2O$) δ 1.92 (s, 3H), 2.55 (t, J=6.4 Hz, 2H), 3.97 (t, J=6.4 Hz, 2H); $^{13}C$ NMR DEPT-135 ($D_2O$) δ 18.06, 37.24, 55.75; HRMS m/z calcd for: $C_3H_8AsO_3$ [M−H]⁻ 166.9694, found 166.9693 (FIG. 2). Removal of volatiles from the reaction mixture without neutralization with HCl and purification on silica column with 10-30% MeOH/$CH_2Cl_2$ afforded iodide-free sodium salt of 5.

Figure 3A:
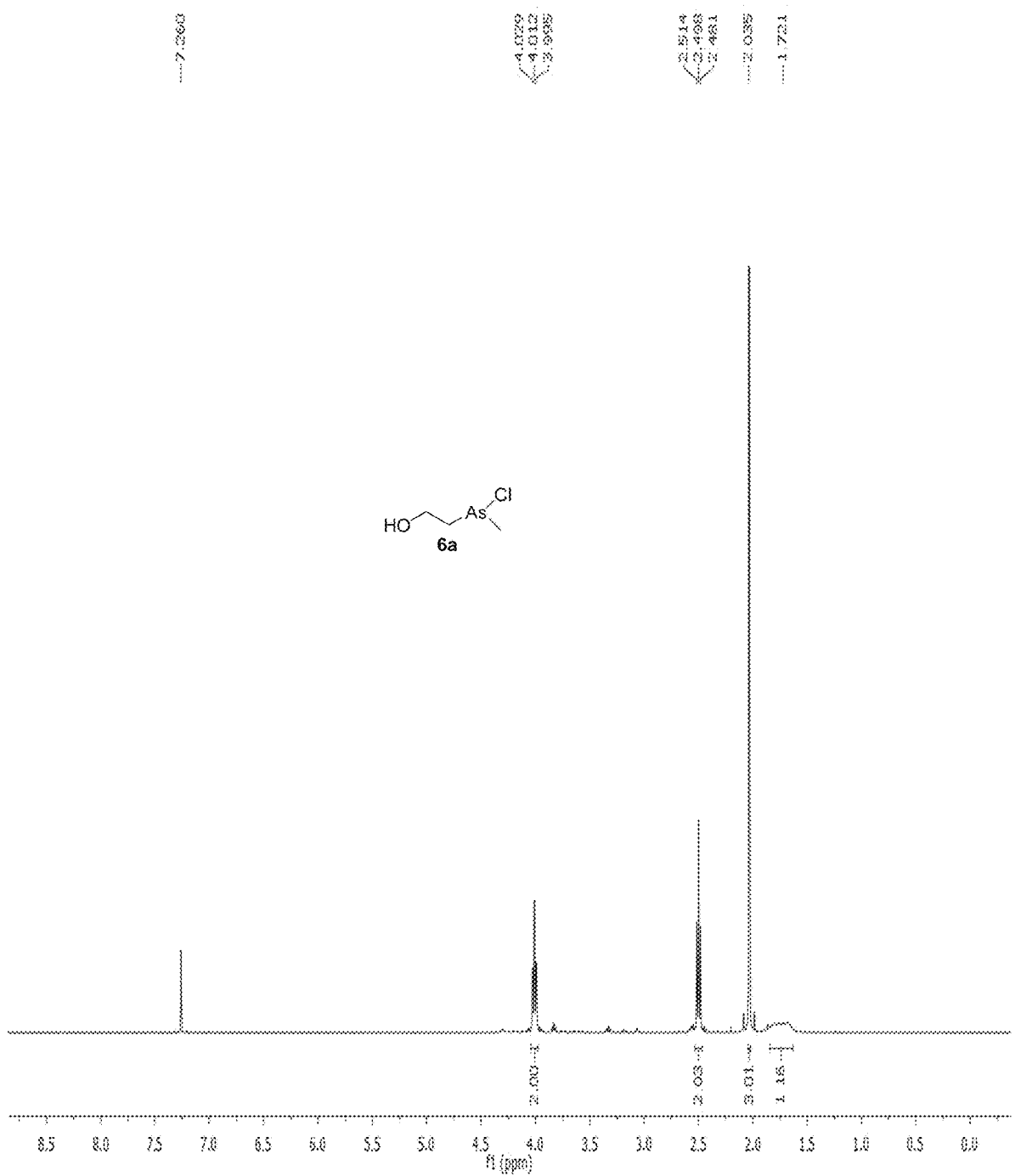
FIGS. 3A-3B show the $^1H$ NMR (A) and $^{13}C$ NMR (B) spectra of compound 6a in $CDCl_3$.
Figure 3B:
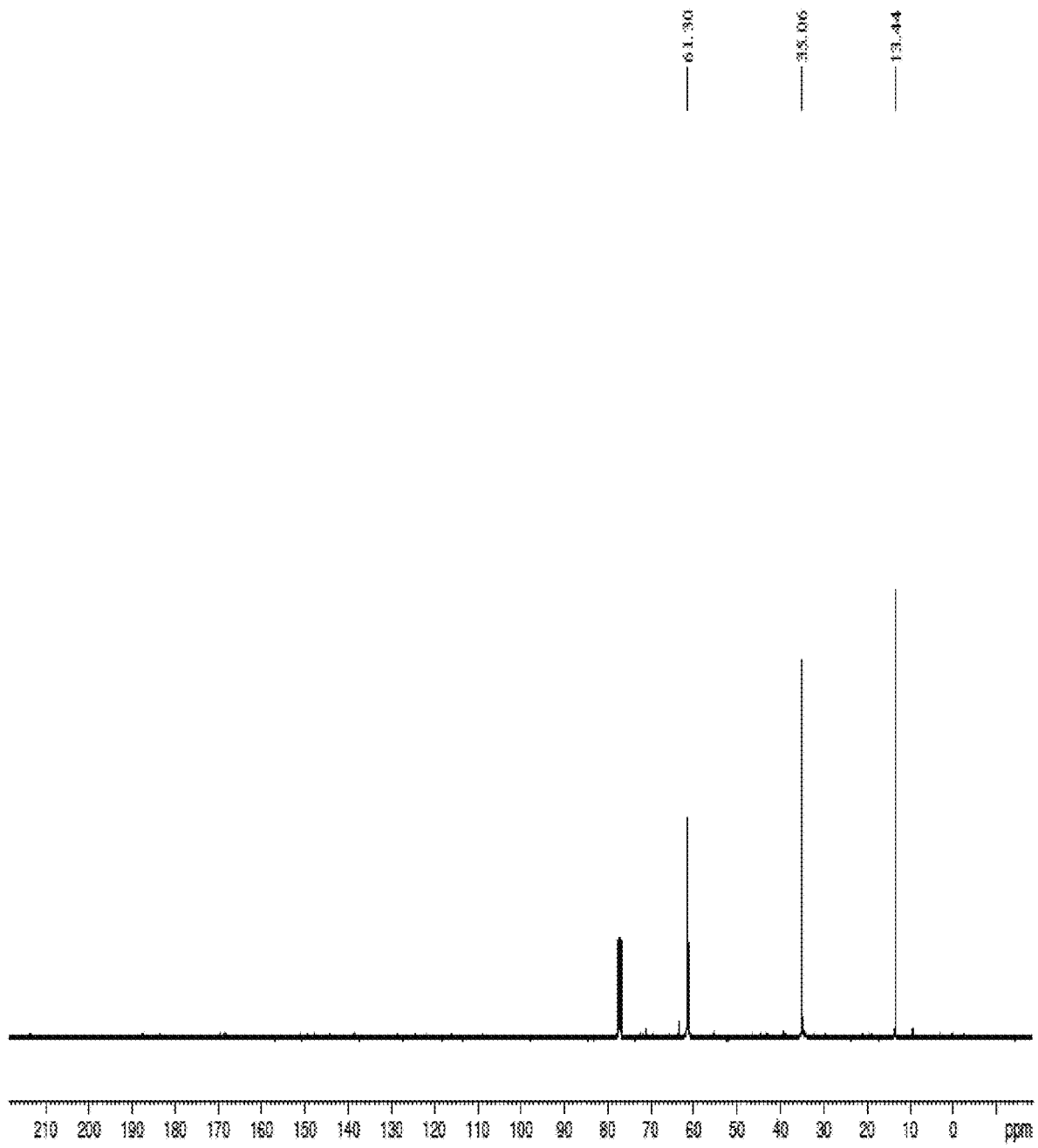

2-Hydroxyethyl(chloro)(methyl)arsine (6a). Conc. HCl (37%, 70 mL) was slowly added into the stirring solution of 5 (15 g, 79 mmol) dissolved in 40 mL $H_2O$ over a 10 min at rt. Next, catalytic amount of KI (200 mg, 1.2 mmol) was added and $SO_2$ gas was passed into this solution for 30 min. with continuous stirring. The mixtures were extracted with $CH_2Cl_2$ (3×70 mL) and dried over anhydrous $Na_2SO_4$. The volatiles were evaporated under reduced pressure to give 6a (12.3 g, 92%) as yellowish oil: $^1H$ NMR ($CDCl_3$) δ 1.72 (brs, 1H), 2.04 (s, 3H), 2.50 (t, J=6.8 Hz, 2H), 4.01 (t, J=6.8 Hz, 2H); $^{13}C$ NMR ($CDCl_3$) δ 22.0, 35.8, 61.4 (FIG. 3).

Figure 4:
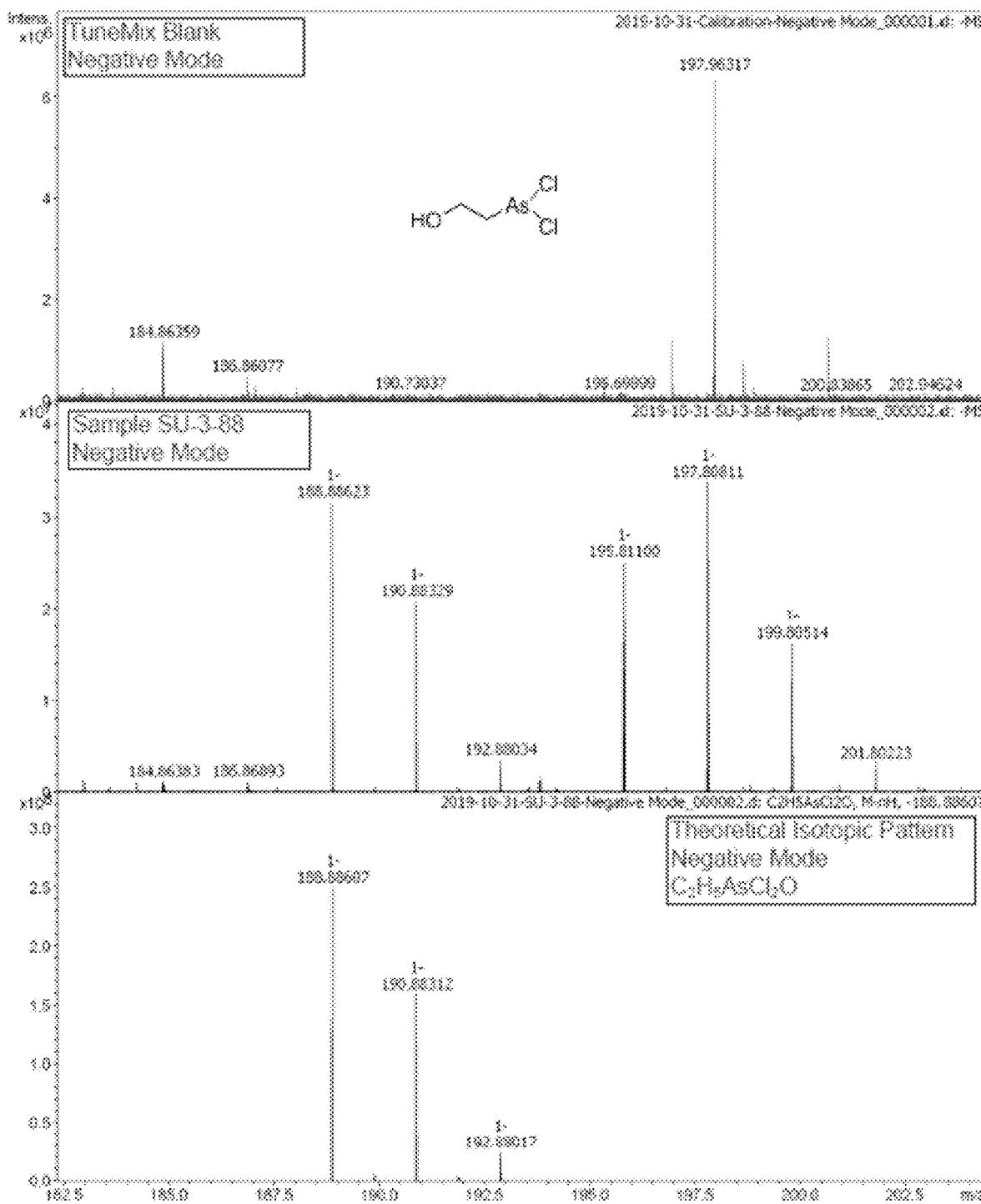
FIG. 4 shows the HRMS spectrum of dichloro(2-chloroethyl)arsine.

Treatment (0° C. to rt, 3 h) of the stirred solution of 6a (12 g, 70.4 mmol) in anhydrous $CH_2Cl_2$ (60 mL) with $SOCl_2$ (12.3 mL, 20.1 g, 0.17 mol) followed by removal of volatiles under reduced pressure provided dichloro(2-chloroethyl)arsine (8.7 g, 65%) (FIG. 4) as brown liquid with the $^1H$ and $^{13}C$ NMR spectra (HRMS m/z calcd for: $C_2H_4AsOCl_2$ [M−H]⁻ 188.8860 found 188.8862) instead of desired chloro(2-chloroethyl)(methyl)arsine 6b.

Figure 5A:
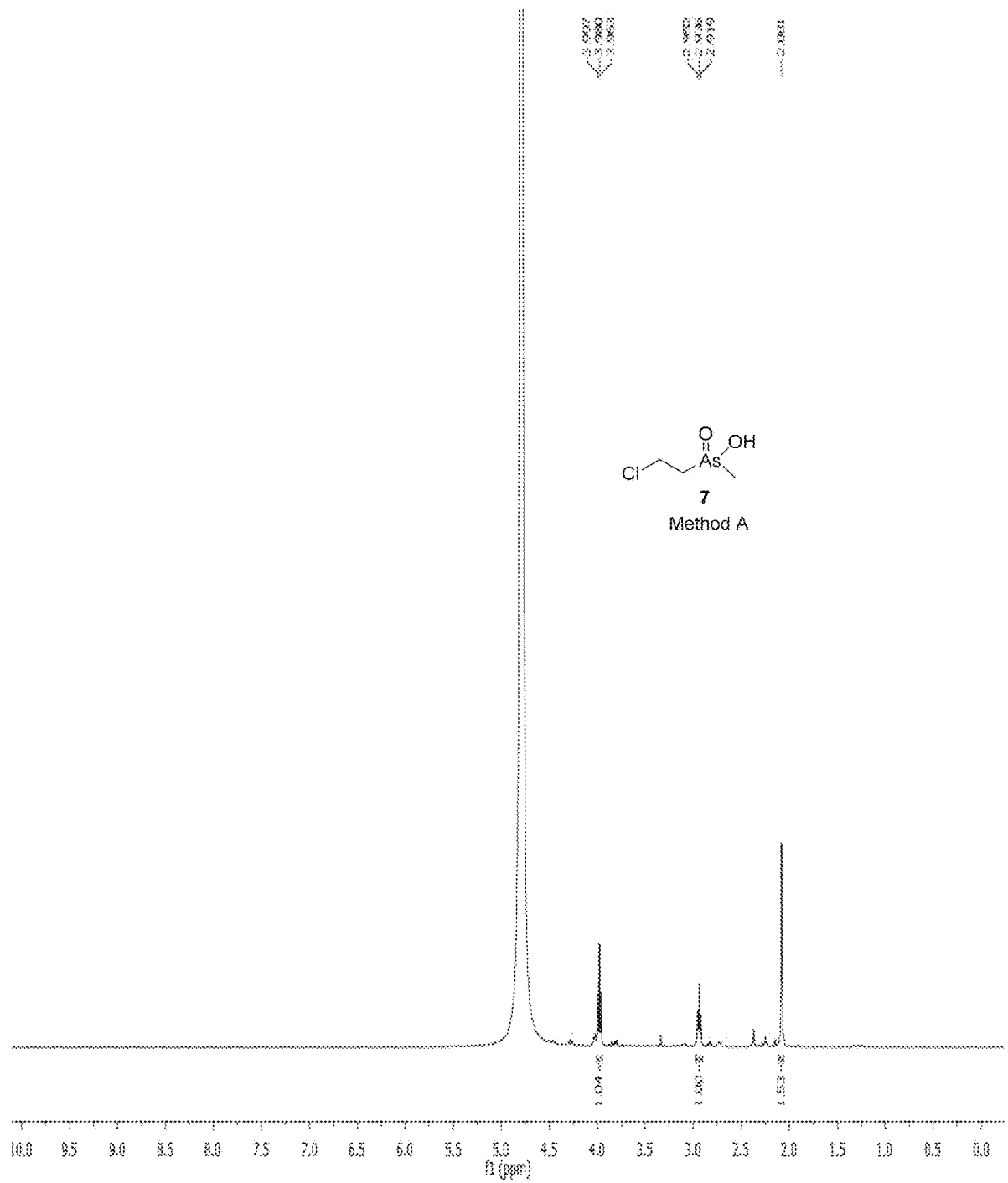
FIGS. 5A-5B show the $^1H$ NMR (A) and $^{13}C$ NMR (B) spectra of compound 7 from method A.
Figure 5B:
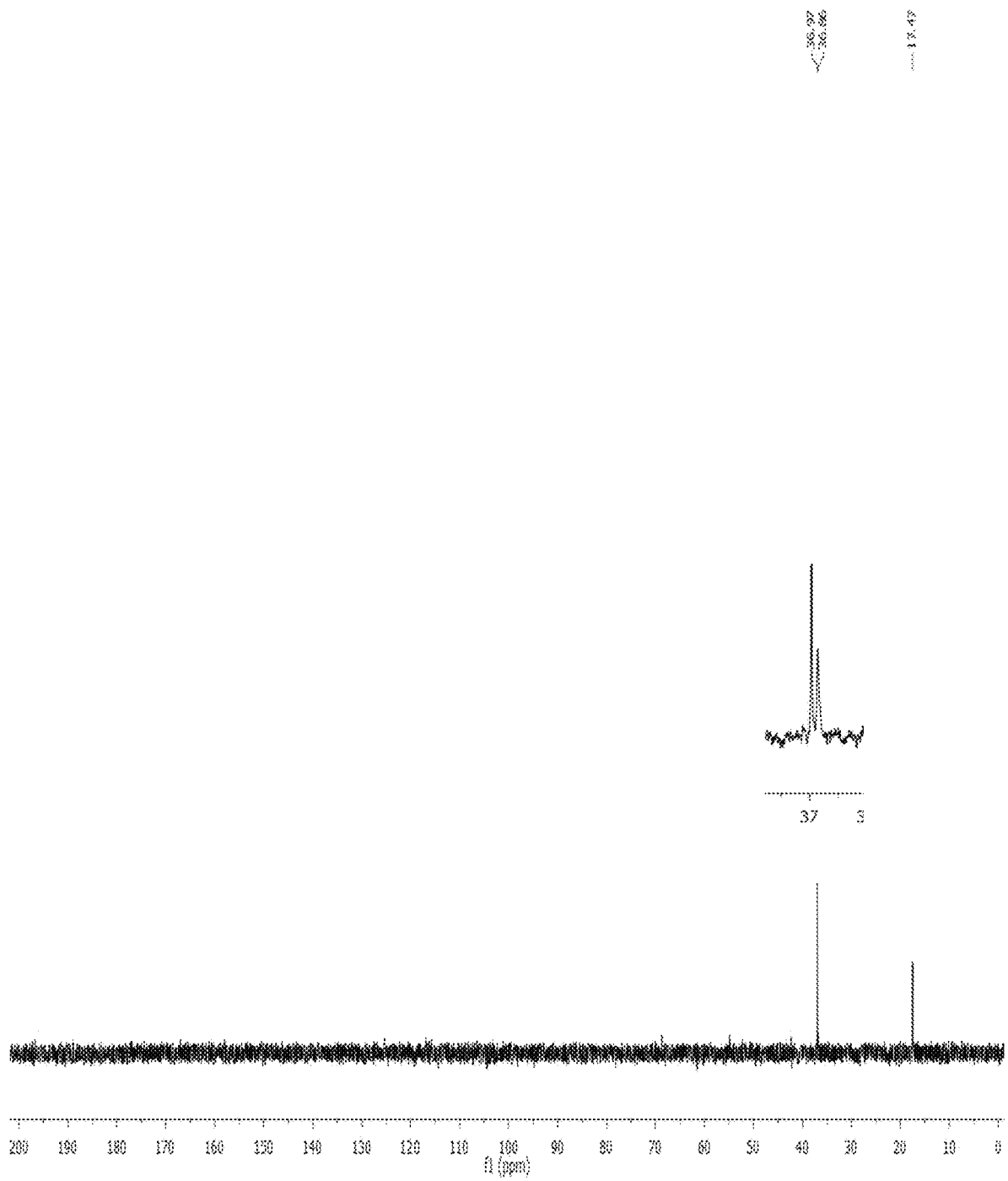
Figure 6:
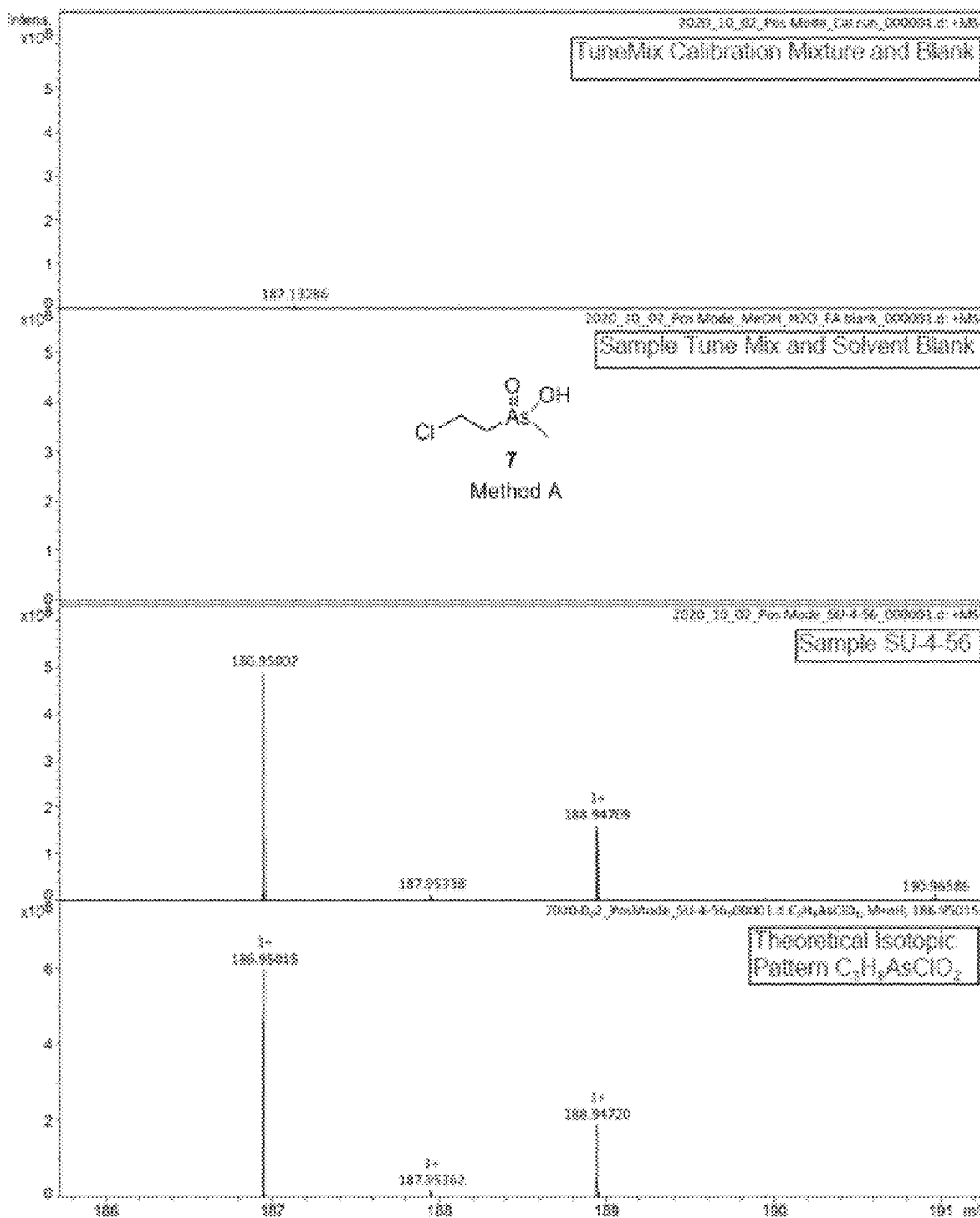
FIG. 6 shows the HRMS spectrum of compound 7.

2-Chloroethyl(methyl)arsinic acid (7). Method A. $SOCl_2$ (10 mL) was added to an iodide free sodium salt of 5 (500 mg, 2.63 mmol) in a dry flask at 0° C. (ice-bath) and was stirred at rt for 15 h. The reaction was quenched by adding 20 mL water and extracted with $CH_2Cl_2$. The aqueous phase was separated and volatiles were evaporated at reduced pressure. The residue was purified by column chromatography (20→30% MeOH/$CH_2Cl_2$) to give mixture of 7 and 5 as a sticky solid (450 mg; 80:20). Second silica column purification afforded pure 7 (20 mg) as colorless gummy solid in addition to mixture of 7 and 5 as a gummy solid (400 mg; 85:15); $^1H$ NMR (400 MHz, $D_2O$) δ 2.08 (s, 2H), 2.94 (t, J=6.6 Hz, 1H), 3.98 (t, J=6.8 Hz, 1H); $^{13}C$ NMR (101 MHz, $D_2O$) δ 17.47, 36.86, 36.97; HRMS m/z calcd for: $C_3H_9AsClO_2$ [M+H]⁺ 186.9501, found 186.9500 (FIGS. 5 and 6).

Method B. Trimethylsilyl chloride (755 μL, 647 mg, 5.96 mmol) was added to a stirring solution of sodium salt of 5 (500 mg, 2.98 mmol) in DMSO (1 mL) at rt. The resulting mixture was stirred at rt for 14 h. The reaction was quenched by adding 10 mL water and extracted with EtOAc (5×10 mL) to remove DMSO. The aqueous phase was separated, and volatiles were evaporated at reduced pressure to give a gummy solid (~400 mg) containing 7 (8%, based on $^1H$ NMR and HPLC-ICP-MS) and unchanged 5 (92%). HRMS m/z calcd for: $C_3H_9AsClO_2$ [M+H]⁺ 186.9501, found 186.9500 for 7 and m/z calcd for $C_3H_{10}AsO_3$ [M+H]⁺ 168.9840, found 168.9840 for 5.

Figure 7A:
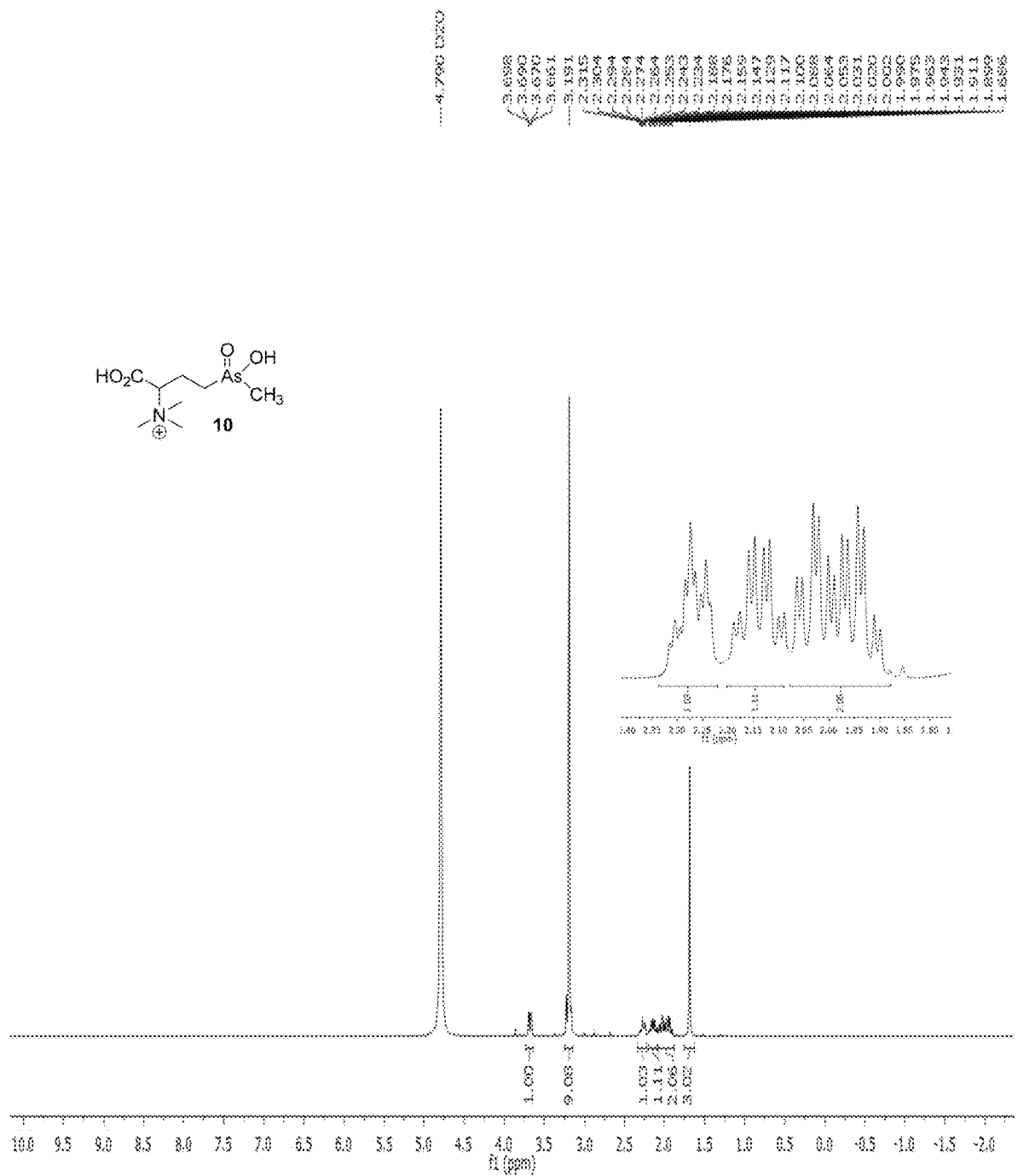
FIGS. 7A-7B show the $^1$H NMR and $^{13}$C NMR spectra of compound 10.
Figure 7B:
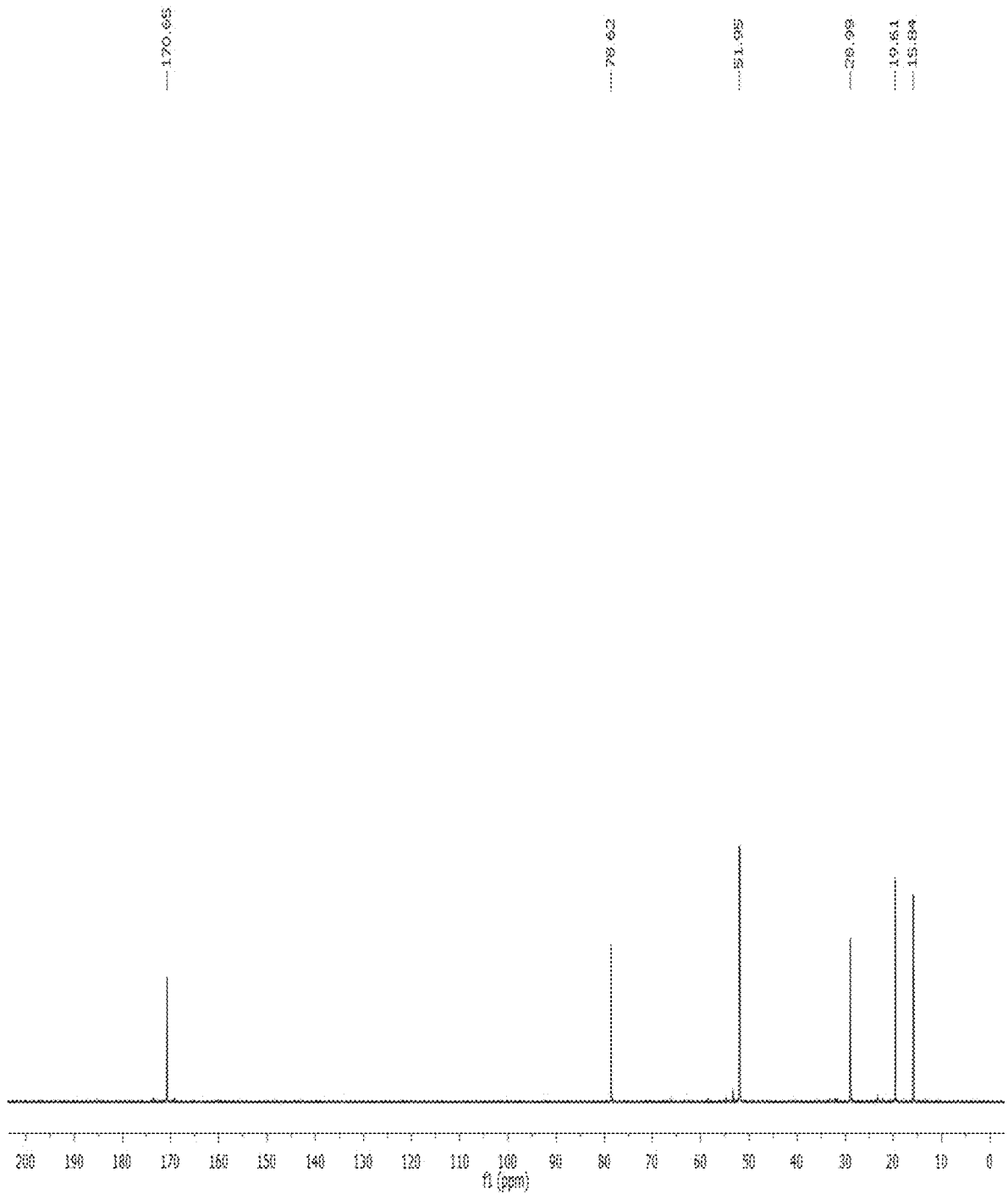
Figure 8:
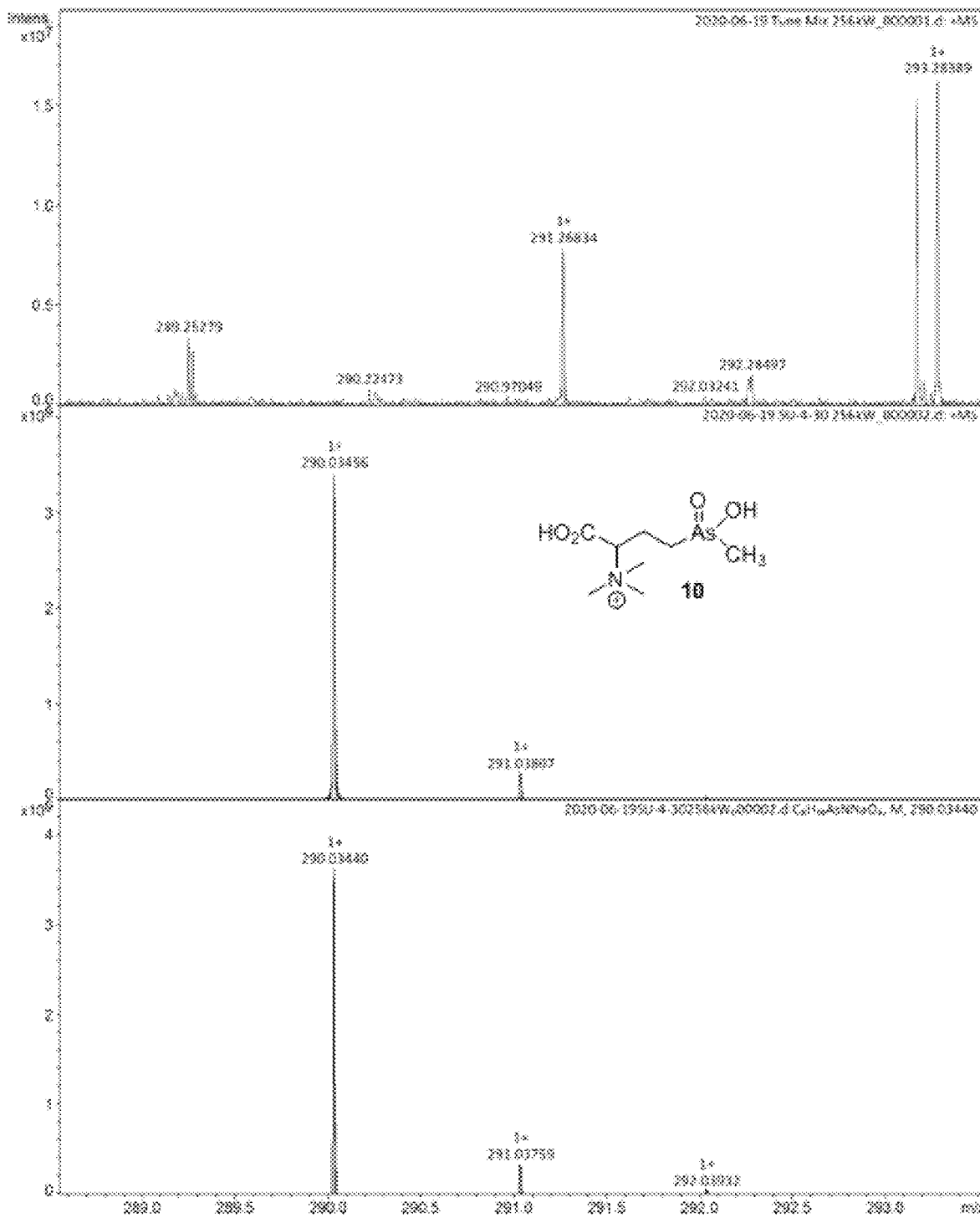
FIG. 8 shows the HRMS spectrum of compound 10.

N-[1-Carboxy-3-(hydroxyl(methyl)arsonyl)propan-1-yl]-N,N,N-trimethylammonium hydroxide (10). (a) Reduction. AST-OH (2; 50 mg, 0.22 mmol) was dissolved in 2.2 mL of the mixture of concentrated HCl and water (1:1, 5 mL). Then catalytic amount of KI (2.2 mg, 0.013 mmol) was added and $SO_2$ gas was passed into this solution for 15 min at rt. The pH was then adjusted around 11 with 6 M NaOH (aq) solution under $N_2$. (b) Methylation. To the solution from step a, $CH_3I$ (1.1 mL) was added and the mixture was stirred at 50° C. for 2 h. After 2 h, the pH of the reaction mixture showed around 6.5. The volatiles were evaporated under reduced pressure and the residue was suspended in methanol. The off-white precipitate was removed by vacuum filtration. Evaporation of volatiles from the filtrate at reduced pressure gave brown solid. The residue was dissolved in 2 mL $H_2O$ and applied to a Dowex 50 W×8 (H⁺ form) column (30×1 cm, 10 g) which was washed with 50 mL of $H_2O$. The product was eluted with a solution of $NH_4OH$ (0.5 M, 50 mL). The appropriate fractions (TLC, $R_f$ 0.70, i-PrOH/$H_2O$/$NH_4OH$, 5:2:3; identified by staining with 1% ninhydrin solution) from the ammonium elution (~20 mL) were evaporated under reduced pressure to afford 10 as an off-white solid: $^1H$ NMR ($D_2O$) δ 1.69 (s, 3H), 1.90-2.06 (m, 2H), 2.09-2.19 (m, 1H), 2.23-2.32 (m, 1H), 3.19 (s, 9H), 3.68 (dd, J=11.6, 3.6 Hz, 1H); $^{13}C$ NMR ($D_2O$) δ 15.84, 19.61, 28.99, 51.95, 78.62, 170.65; HRMS m/z calcd for: $C_8H_{19}AsNNaO_4$ [M+H]⁺ 290.0344, found 290.0346 (FIGS. 7 and 8).

Figure 9A:
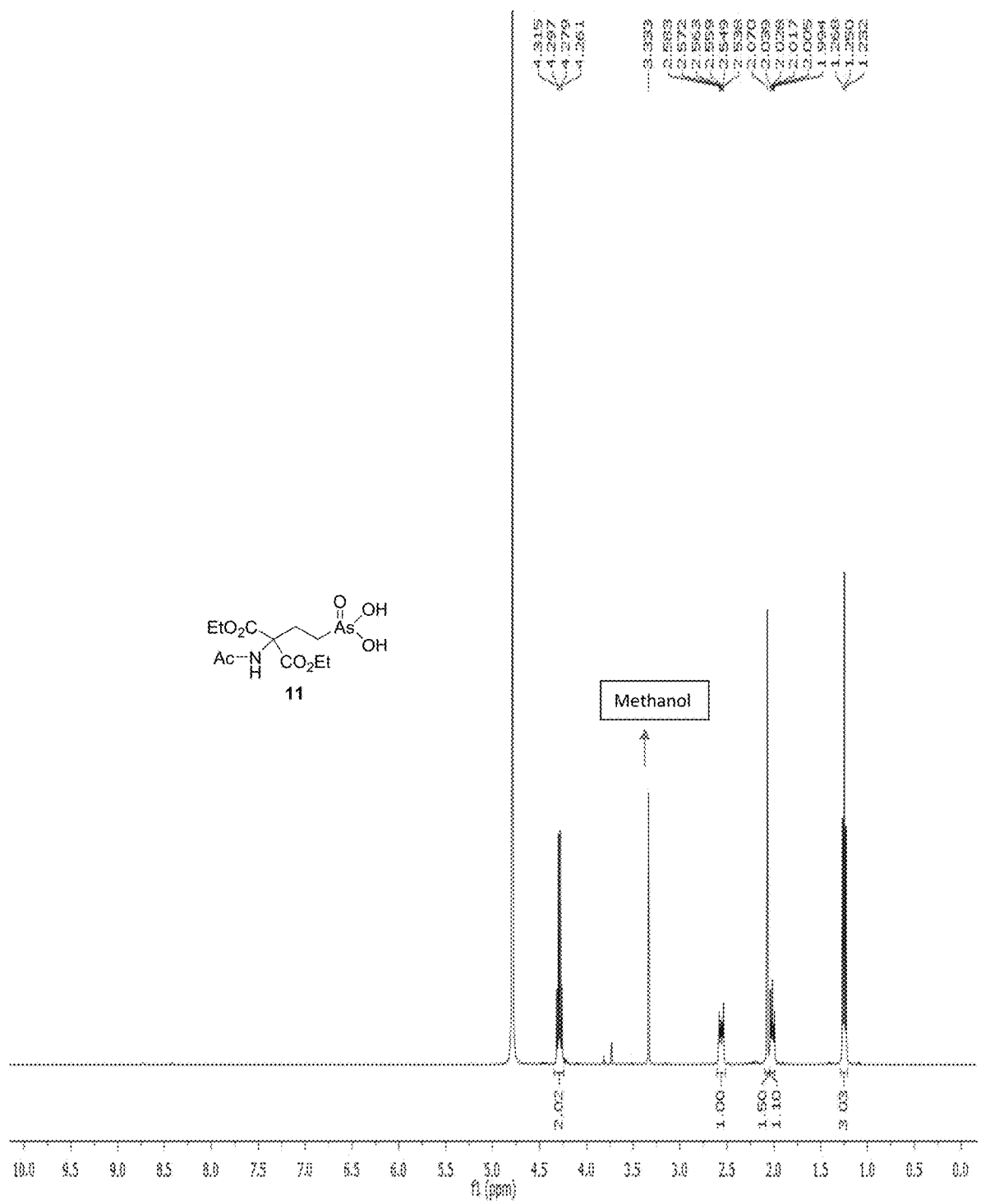
FIGS. 9A-9B show the $^1$H NMR and $^{13}$C NMR spectra of compound 11.
Figure 9B:
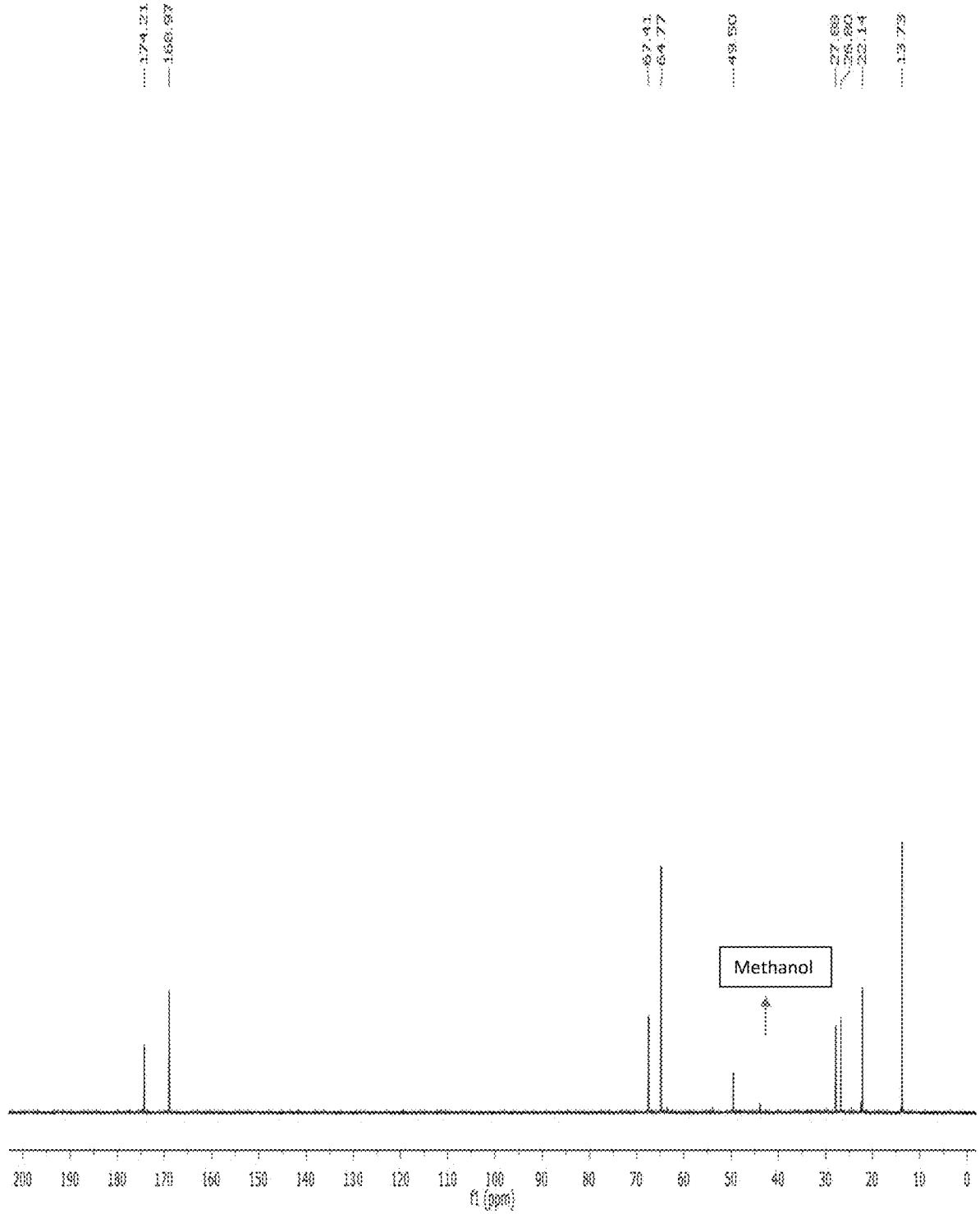
Figure 10:
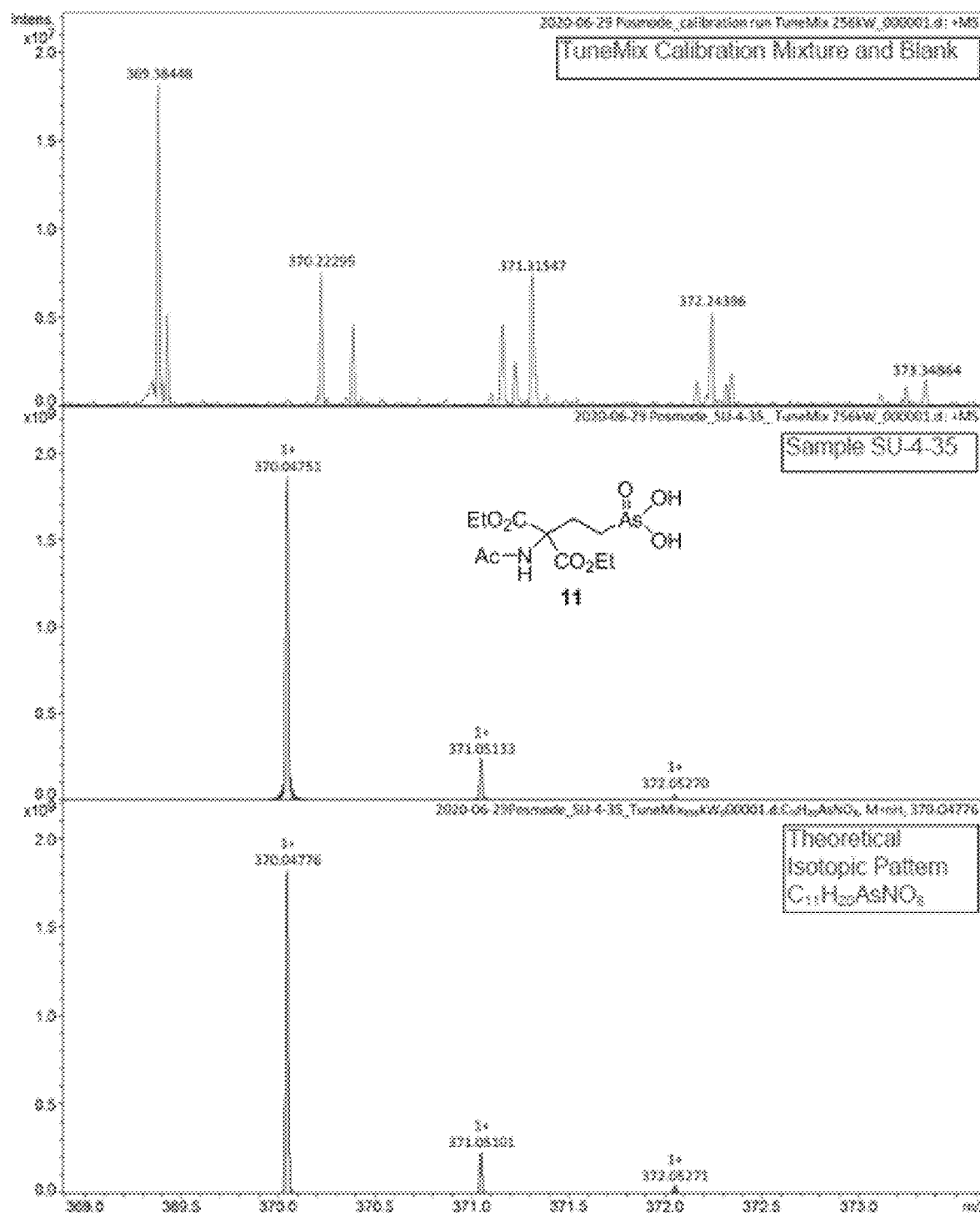
FIG. 10 shows the HRMS spectrum of compound 11.

Ethyl-2-Acetamido-2-ethoxycarbonyl-4-(hydroxymethylarsinoyl)butanoate (11). Sodium (1.46 mg, 63.6 mmol) was added into a dry flask containing 40 mL of anhydrous EtOH and the mixture was stirred at ambient temperature until the sodium dissolved. Then diethyl acetamidomalonate (10.4 g, 47.7 mmol) was added, and the resulting mixture was stirred for 1 h. During this time, the reaction was turned into milky white mixture. To the above mixture solid (2-chloroethyl)arsenic acid (3.0 g, 15.9 mmol) was added and the resulting mixture was stirred at 70° C. in an oil bath for 4 h. Volatiles were evaporated under reduced pressure to give crude 11 as a brownish solid, which was suspended in $H_2O$ and transferred to a separatory funnel. The mixture was extracted with $CH_2Cl_2$ (6×50 mL) to remove excess malonate and aqueous layer was collected. The volatiles were evaporated under reduced pressure and residue was suspended in 30% MeOH in $CH_2Cl_2$. The off-white precipitate was removed by vacuum filtration. Evaporation of the volatiles at reduced pressure gave brown solid which was loaded on the silica column. The residual malonate was removed by 5-10% MeOH in $CH_2Cl_2$ until all the yellow color eluted. Then the arsenic compound was eluted by 30% MeOH. Only the colorless fractions were collected. Volatiles were evaporated under reduced pressure to afford 6.0 g white solid which on $^1$H NMR spectra showed approximate 10% malonate impurity. Second silica column purification gave pure 11 (5.2 g, 89%) as white solid: $^1$H NMR (D$_2$O) δ 1.25 (t, J=7.2 Hz, 6H), 1.99-2.04 (m, 2H), 2.07 (s, 3H), 2.54-2.58 (m, 2H), 4.29 (q, J=7.2 Hz, 4H); $^{13}$C NMR (D$_2$O) δ 13.73, 22.14, 26.80, 27.88, 64.77, 67.41, 168.97, 174.21; HRMS m/z calcd for: $C_{11}H_{21}AsNO_8$ [M+H]$^+$ 370.0478, found 370.0475 (FIGS. 9 and 10).

Figure 11A:
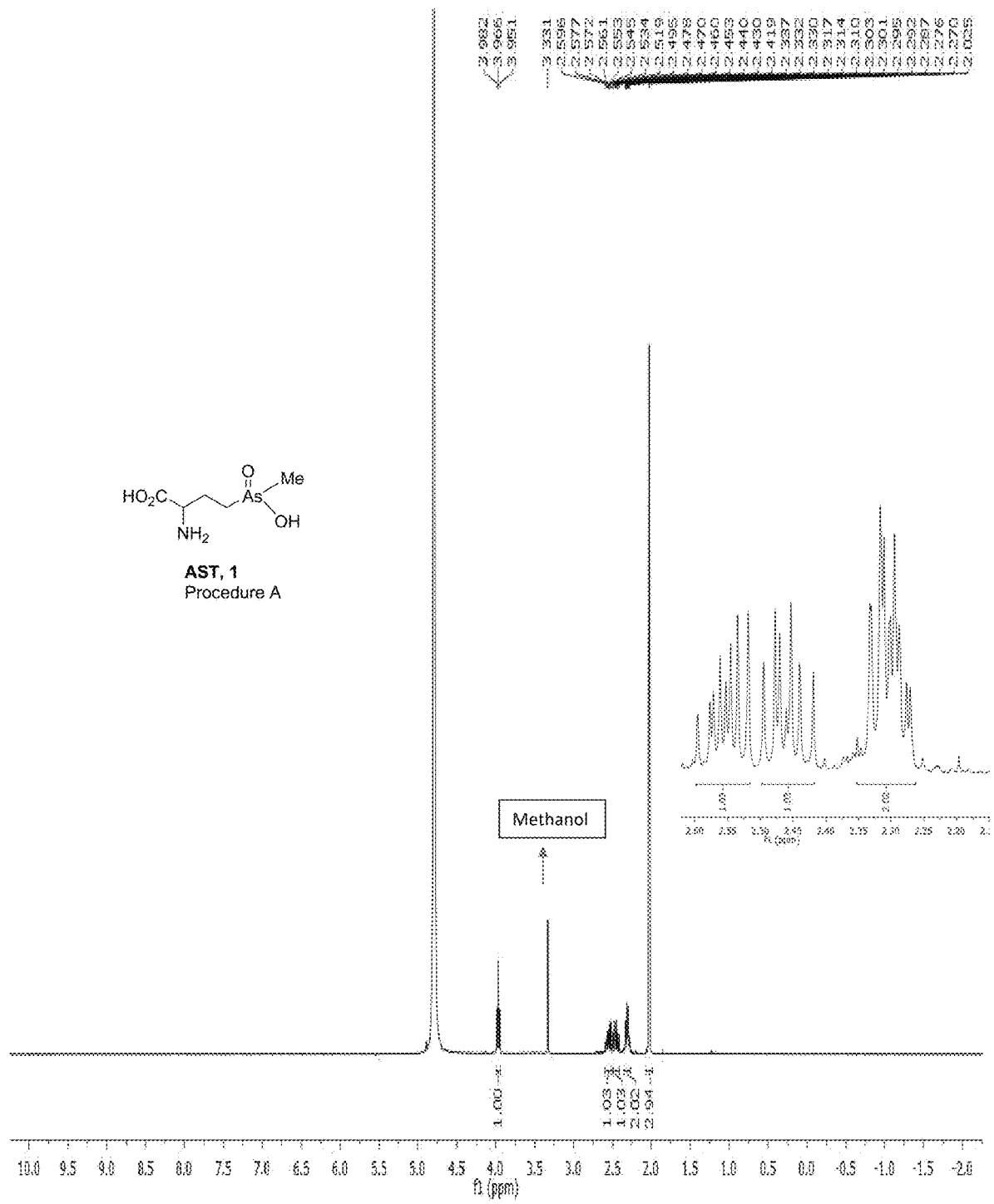
FIGS. 11A-11B show the $^1$H NMR and $^{13}$C NMR spectra of compound 1 from procedure A.
Figure 11B:
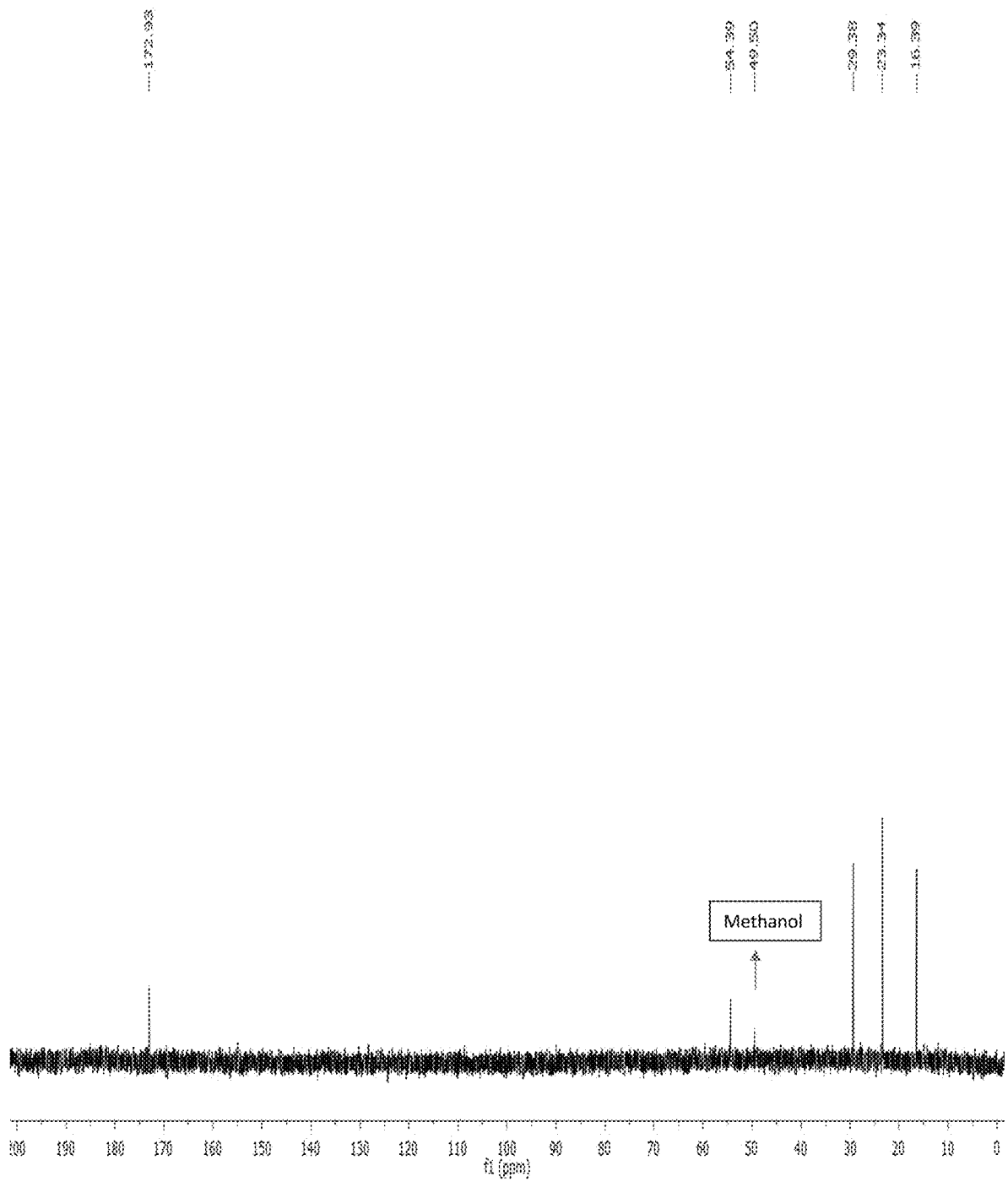
Figure 12:
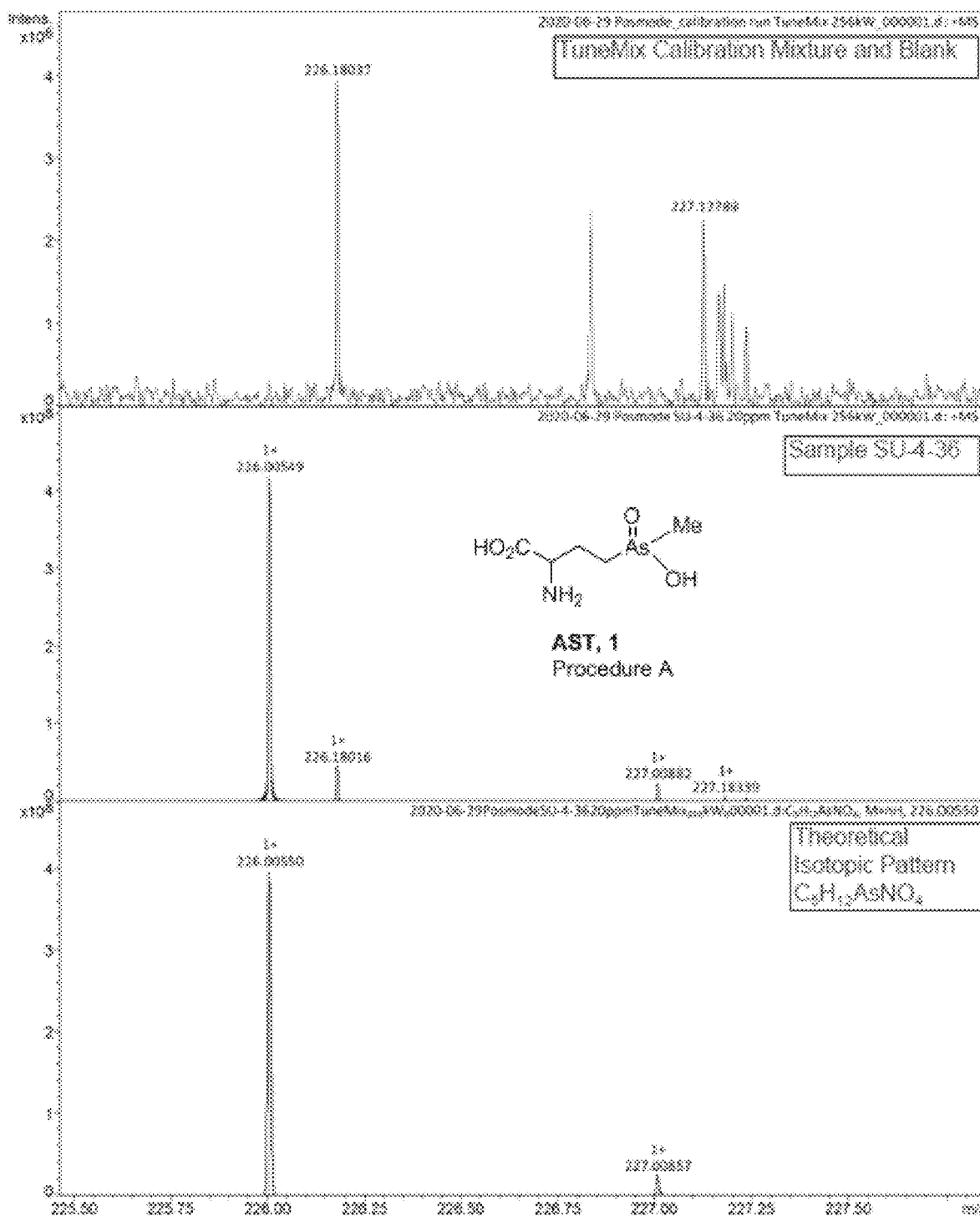
FIG. 12 shows the HRMS spectrum of compound 1 from procedure A.

2-Amino-4-(hydroxymethylarsinoyl)butanoic acid (AST, 1). Procedure A (from 11). (a) Reduction. Compound 11 (500 mg, 1.35 mmol) was dissolved in the mixture of concentrated hydrochloric acid and water (1:1, 14 mL). Then catalytic amount of KI (13.5 mg, 0.08 mmol) was added and SO$_2$ gas was passed into this solution for 15 min at ambient temperature. The pH was then adjusted to around 11 with 6 M NaOH (aq) solution under N$_2$ to give crude 12 which was directly used in next step. (b) Methylation. To the product from step a, MeI (7 mL) was added and the mixture was stirred at 50° C. for 4 h. The reaction progress was monitored by HPLC-ICP-MSA. After 4 h, the pH of the reaction mixture showed around 6.7. The volatiles were evaporated under reduced pressure and the residue was suspended in methanol. The off-white precipitate was removed by vacuum filtration. Evaporation of volatiles from the filtrate at reduced pressure gave brown solid crude 8. (c) Deprotection and decarboxylation. 6 M HCl (20 mL) was added into the crude 8, and the resulting mixture was refluxed at 120° C. in an oil bath for 3 h. The mixture was neutralized with 6 M HCl around pH-7 and white precipitate was filtered out. The volatiles were evaporated under reduced pressure and the residue was suspended in methanol. The off-white precipitate was removed by vacuum filtration. Evaporation of volatiles from the filtrate at reduced pressure gave brown solid crude 1. The residue was dissolved in 15 mL H$_2$O and applied to a Dowex 50 W×8 (H$^+$ form) column (30×1 cm, 10 g) which was washed with 100 mL of H$_2$O. The product was eluted with a solution of NH$_4$OH (0.5 M, 100 mL). The appropriate fractions (TLC, R$_f$ 0.70, i-PrOH/H$_2$O/NH$_4$OH, 5:2:3; identified by staining with 1% ninhydrin solution) from the ammonium elution (~40 mL) were evaporated under reduced pressure to afford 1 as an off-white solid with some impurities. The residue was dissolved in 5 mL H$_2$O and was applied onto a Sephadex LH-20 (GE Healthcare) column with a mobile phase 70% (v/v) EtOH at a flow rate of 1.0 mL/min. Arsenic species in each fraction was analyzed by HPLC-ICP-MS. Fractions containing AST with high purity (>95%) were combined and concentrated by a rotary evaporator to afford 1 (200 mg, 65% from 11) as an off-white solid. $^1$H NMR δ 2.03 (s, 3H), 2.27-2.34 (m, 2H), 2.42-2.48 (m, 1H), 2.52-2.58 (m, 1H), 3.97 (t, J=6.4 Hz, 1H); $^{13}$C NMR δ 16.39, 23.34, 29.39, 54.39, 172.93; HRMS m/z calcd for $C_5H_{13}AsNO_4$ [M+H]$^+$ 226.0055, found 226.0055 (FIGS. 11 and 12).

Use of pure 11 free of diethyl acetamidomalonate impurities is critical since during deprotection and decarboxylation steps these impurities are converted to glycine that is difficult to separate from the AST product during purification on Dowex.

Figure 13A:
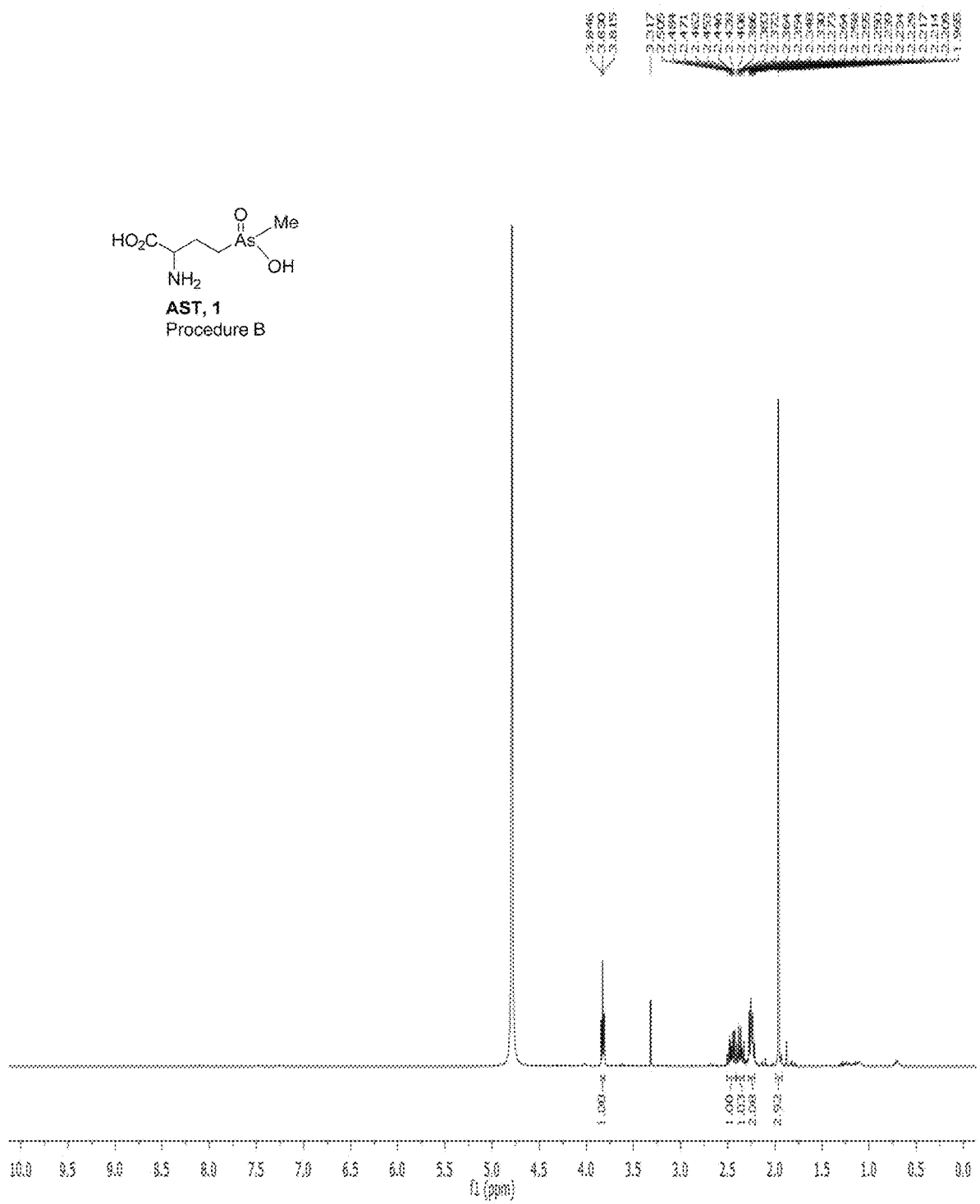
FIGS. 13A-13B show the $^1$H NMR and $^{13}$C NMR spectra of compound 1 from procedure B.
Figure 13B:
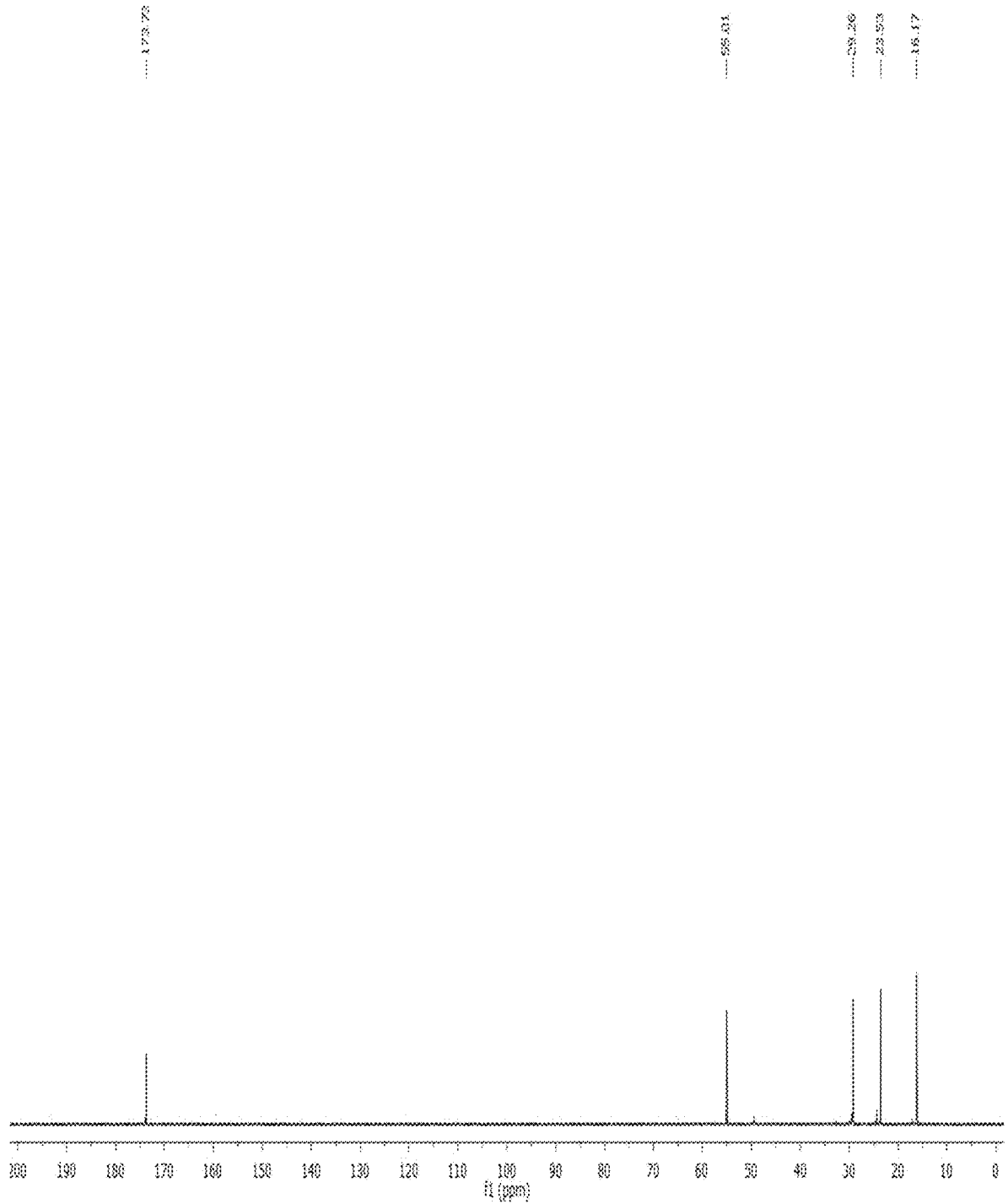

Procedure B (from 7). (a) Condensation. Sodium (198 mg, 8.60 mmol) was added into a dry flask containing anhydrous EtOH (5 mL) and the mixture was stirred at rt until the sodium dissolved. Then diethylacetamidomalonate (1.40 g, 6.45 mmol) was added, and the resulting mixture was stirred for 30 min, followed by addition of a mixture 7 and 5 (85:15, 400 mg from Method A) dissolved in 2 mL EtOH. The resulting mixture was stirred at 70° C. for 4 h. Volatiles were evaporated under reduced pressure, yielding crude 8. (b) Deprotection and decarboxylation. Subjection of crude 8 to the same protocol as described for Procedure A (step c) also gave 1 (72 mg, 17%) as an off-white solid (FIG. 13): $^1$H NMR δ 1.97 (s, 3H), 2.21-2.27 (m, 2H), 2.33-2.41 (m, 1H), 2.43-2.51 (m, 1H), 3.83 (t, J=6.2 Hz, 1H); $^{13}$C NMR δ 16.17, 23.53, 29.26, 55.01, 173.73; HRMS m/z calcd for $C_5H_{13}AsNO_4$ [M+H]$^+$ 226.0055, found 226.0055.

Treatment of crude 7 (350 mg, from Method B) with EtONa and diethylacetamidomalonate as described for Procedure B afforded 1 (5% from 5, based on HPLC-ICP-MS). The presence of 1 was confirmed by HPLC-ICP-MS and HRMS calcd for $C_5H_{11}AsNO_4$ [M−H]$^−$ 223.9909, found 223.9909.

Arsenic Speciation by HPLC-ICP-MS. Arsenic species were determined by HPLC-ICP-MS using the HPLC retention time of known standards.

Assay of Antibiotic Activity. Single colonies of E. coli W3110 were inoculated in M9 medium (47.7 mM Na$_2$HPO$_4$, 22 mM KH$_2$PO$_4$, 8.6 mM NaCl, 18.7 mM NH$_4$Cl, 2 mM MgSO$_4$ and 0.1 mM CaCl$_2$) supplemented with 0.2% glucose (w/v) and cultured in the absence or presence of the indicated concentrations of chemically synthesized AST (D,L-AST), semisynthetic AST (sAST), biogenic AST (bAST), L-AST or D-AST for 16 h at 37° C. The $A_{600nm}$ was determined to compare the antibiotic activity of each compound.

Assay of Glutamine Synthetase (GS) Inhibition. Inhibition of GS activity by bAST, sAST or D,L-AST was analyzed by a coupled assay using GS from E. coli (Millipore-Sigma), as described previously, with minor modifications. Briefly, the GS reaction was initiated by addition of L-glutamate (5, 10, 20 or 50 mM) to the reaction mixture (100 mM Tris-acetate (pH 8.6), 9 mM ATP, 1 mM phosphoenolpyruvate, 60 mM Mg$_2$Cl, 19 mM KCl, 45 mM NH$_4$Cl, 0.25 mM NADH, 13-20 units of L-lactic dehydrogenase, 8-14 units of pyruvate kinase and 1 unit of GS) and incubated at 37° C. in the absence or presence of 0.5 or 2.0 μM of bAST, sAST or D,L-AST, and the decrease in $A_{340}$ nm was monitored to quantify oxidation of NADH to NAD$^+$ using an extinction coefficient 6230 M$^{-1}$cm$^{-1}$. Activities were corrected with the values from control assays without enzyme. The inhibition constant ($K_i$) for each AST was determined based on the apparent $K_m$ of GS using Sigma Plot (Systat Software, Inc., Sun Jose, Calif.).

Enzymatic N-acetylation of AST (1). PpArsN1, the AST-selective N-acetyltransferase from Pseudomonas putida KT2440, was purified. 10 μM of 1 (D,L-AST, sAST bAST, L-AST or D-AST) was incubated in a buffer consisting of 20 mM Tris-HCl (pH 7.4), 1 mM ethylenediaminetetraacetic acid, 0.2 mM acetyl coenzyme A (AcCoA) at 37° C. for 30 min, with or without 0.2 μM PpArsN1. The reaction solution was filtered using an Amicon Ultra centrifugal filter with a 3K cutoff membrane (MilliporeSigma), and arsenic species in the filtrate were analyzed by HPLC-ICP-MS.

Figure 14A:
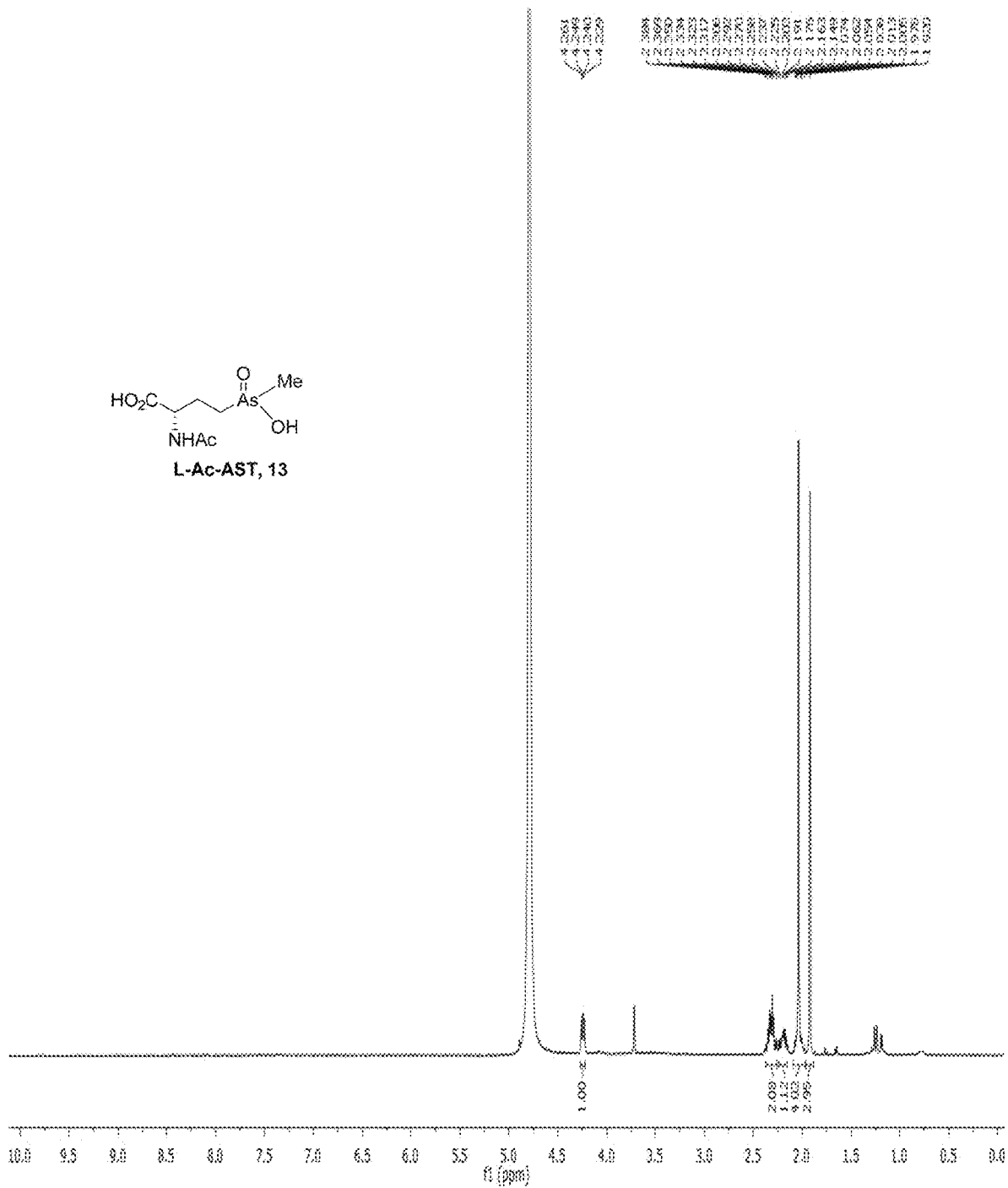
FIGS. 14A-14B show the $^1$H NMR and $^{13}$C NMR spectra of compound 13.
Figure 14B:
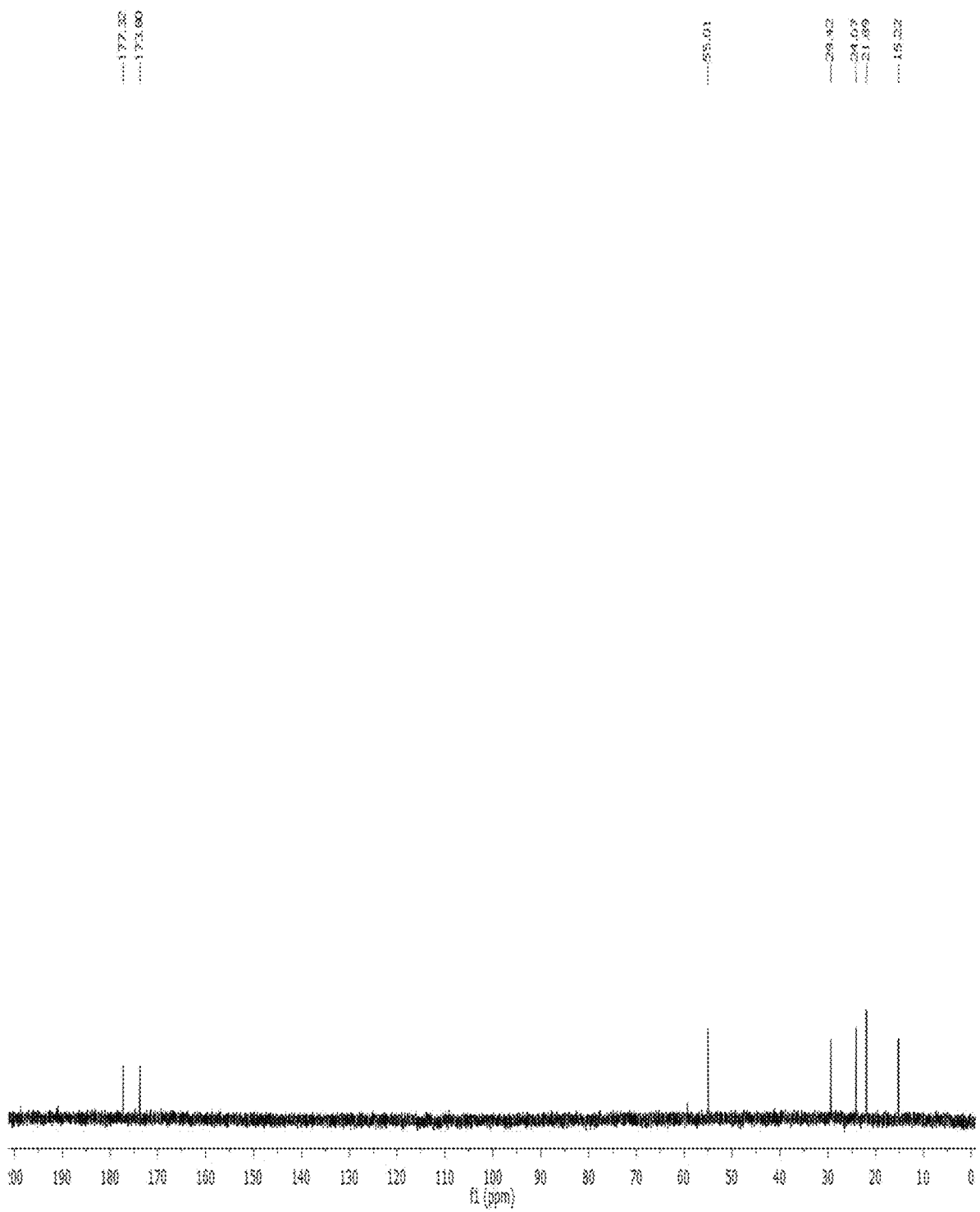
Figure 15:
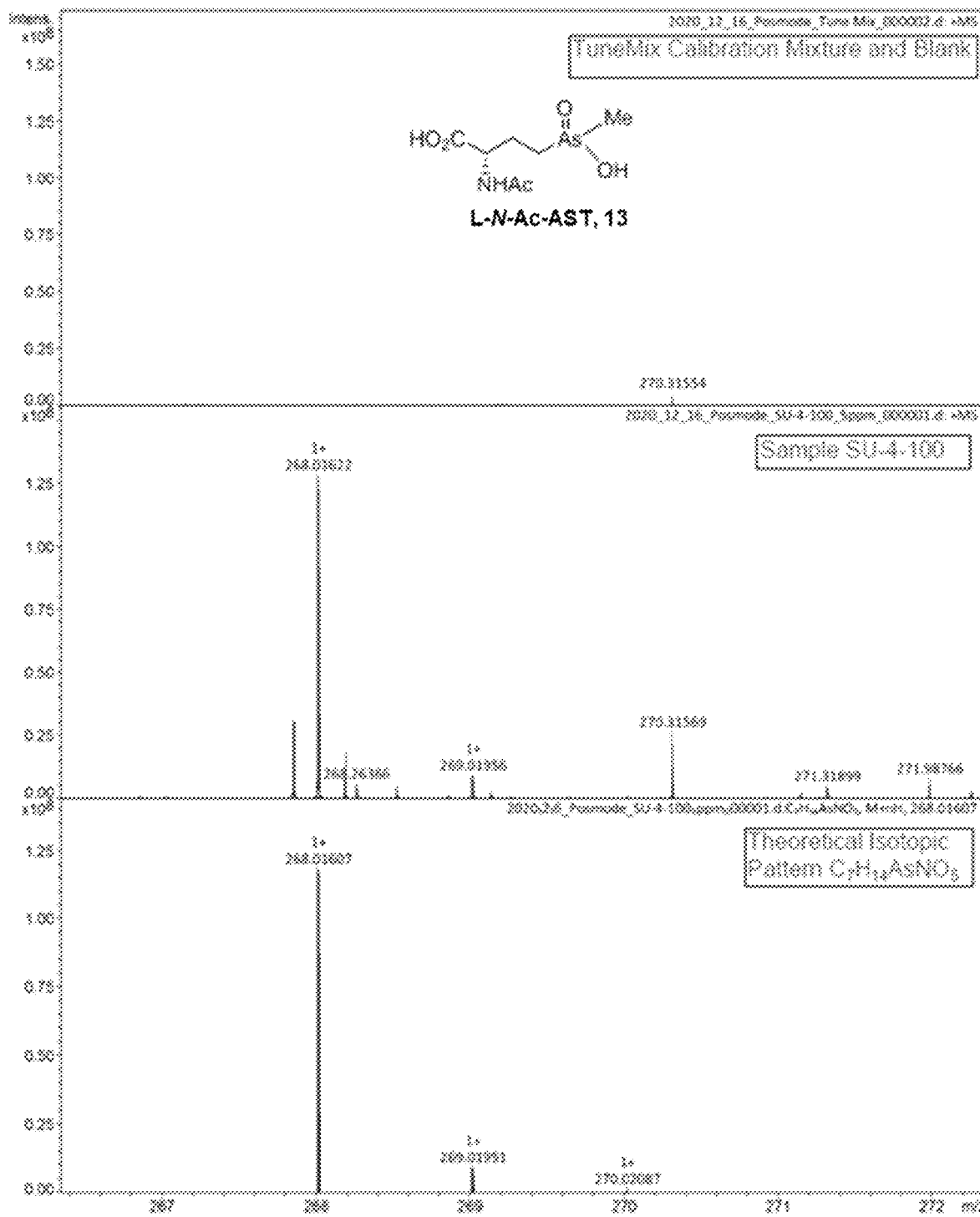
FIG. 15 shows the HRMS spectrum of compound 13.

2-Acetamido-4-(hydroxymethylarsinoyl)butanoic acid (L-N-Ac-AST, 13): For purification of L-AST, a larger amount of D/L-AST 1 (0.9 mM, 35 mL, 7 mg) was incubated overnight with 1 mM AcCoA and 20 μM PpArsN1 in a buffer consisting of 20 mM Tris-HCl, pH 7.4 at 37° C. The reaction solution was filtered using an Amicon Ultra centrifugal filter with a 3K cutoff membrane to remove protein. The filtrate was concentrated to 5 mL by rotary evaporation at reduced pressure and separated by Sephadex LH-20 size-exclusion chromatography. Arsenic species in each fraction was analyzed by HPLC-ICP-MS. Fractions containing putative L-N-Ac-AST with high purity (>90%) were combined and concentrated by a rotary evaporation. The concentrated L-N-Ac-AST solution was applied again to Sephadex LH-20 size-exclusion chromatography for further purification. Fractions containing purified L-N-Ac-AST (>95%) were combined and concentrated to give 13 (3.0 mg, 36% from D,L-AST 1): $^1$H NMR (400 MHz, $D_2O$) δ 1.92 (s, 3H), 19.8-2.07 (m, 1H), 2.04 (s, 3H), 2.24-2.15 (m, 1H), 2.37-2.26 (m, 2H), 4.24 (dd, J=8.2, 4.6 Hz, 1H); $^{13}$C NMR (101 MHz, $D_2O$) δ 15.22, 21.89, 24.07, 29.42, 55.01, 173.80, 177.32; HRMS m/z calcd for: $C_7H_{15}AsNO_5$ [M+H]$^+$ 268.0161, found 268.0162. Fractions containing D-AST (>95%) were combined and concentrated to give D-AST (2.1 mg, 30%): HRMS m/z calcd for: $C_5H_{13}AsNO_4$ [M+H]$^+$ 226.0055, found 226.0059 (FIGS. 14 and 15).

Figure 16A:
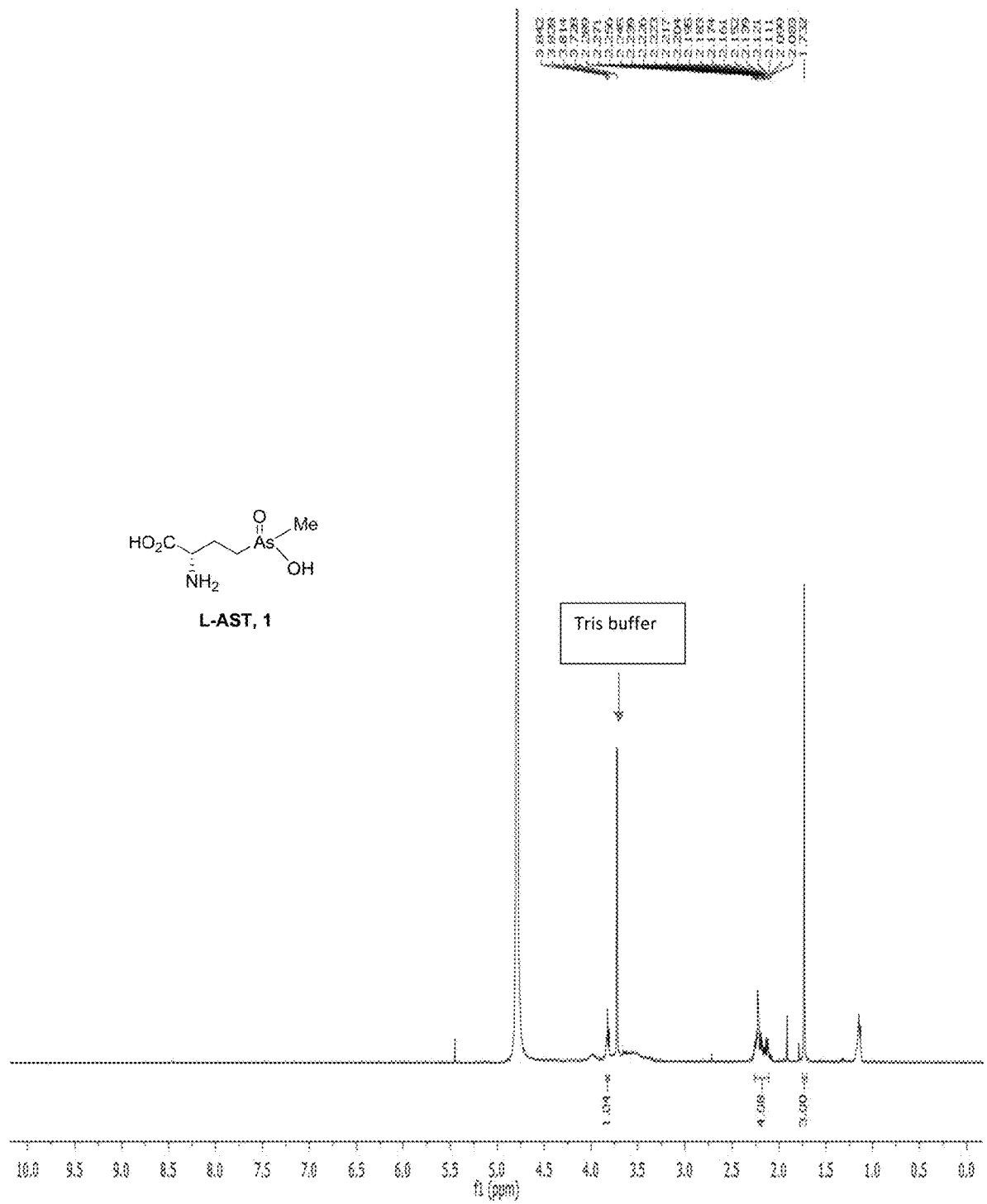
FIGS. 16A-16B show the $^1$H NMR and $^{13}$C NMR spectra of L-AST.
Figure 16B:
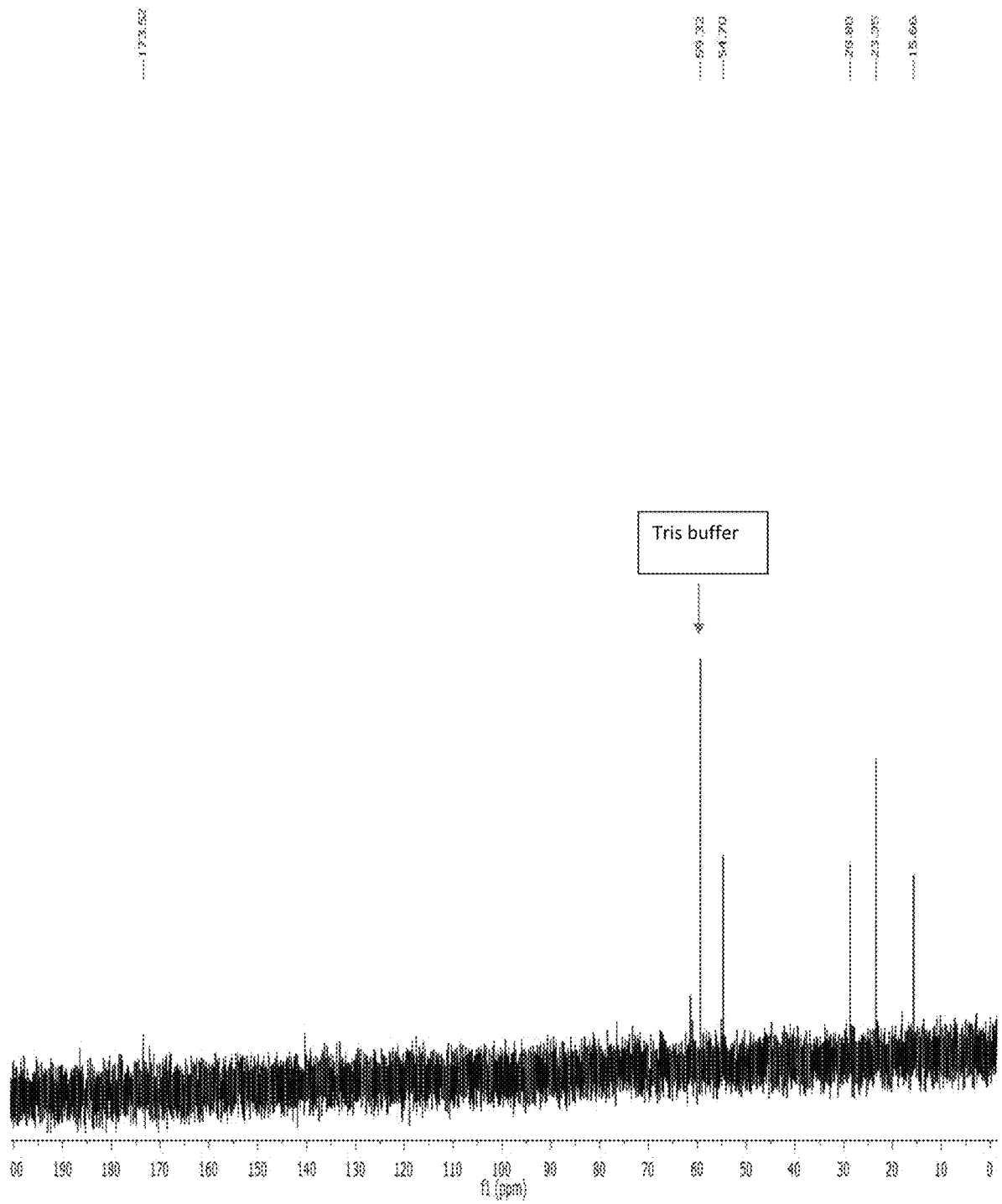
Figure 17:
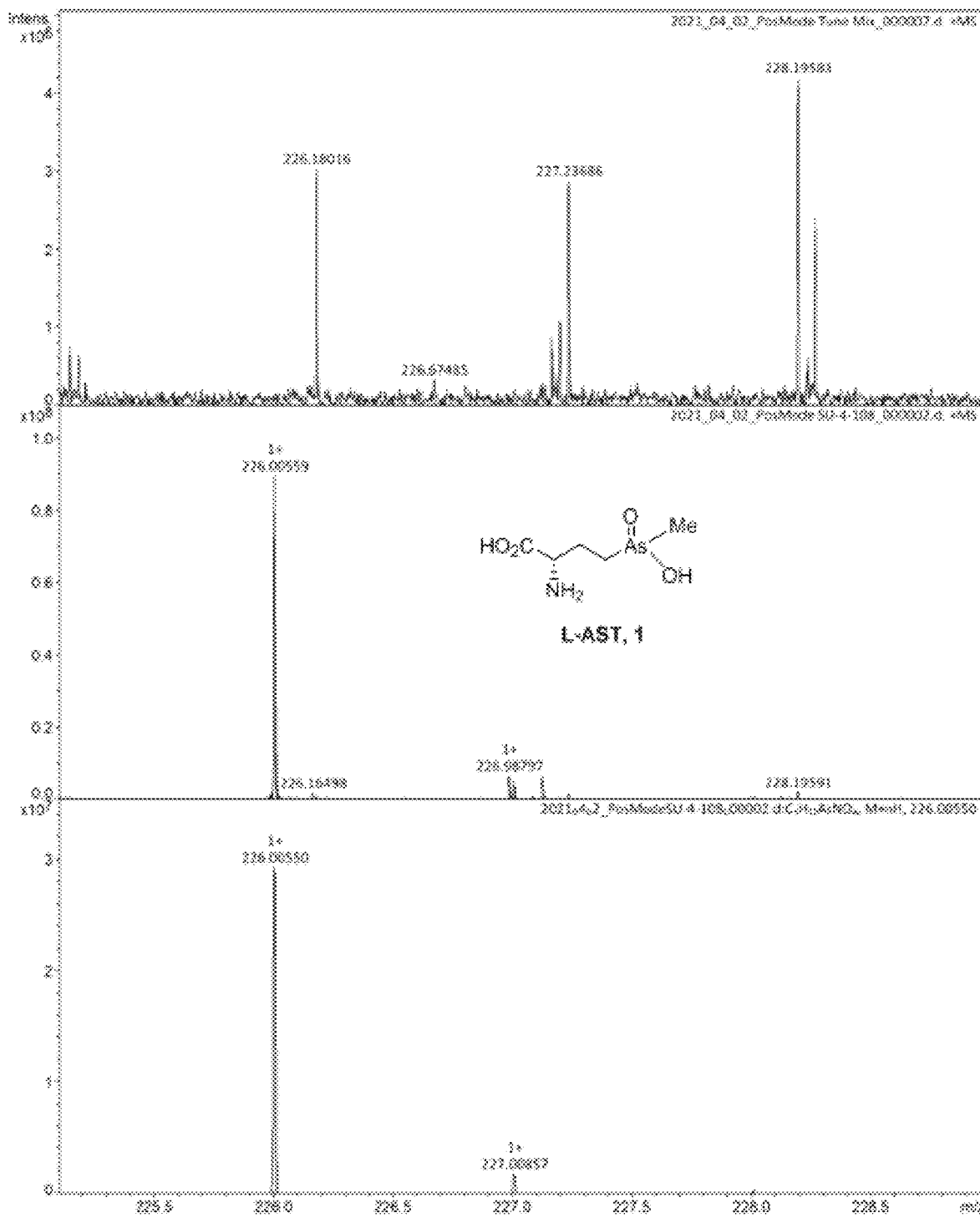
FIG. 17 shows the HRMS spectrum of L-AST.

(S)-2-Amino-4-(hydroxymethylarsinoyl)butanoic acid (L-AST, 1): 2 M HCl (5 mL) was added into 13 (3.0 mg, 0.013 mmol) in round bottom flask, and the resulting mixture was refluxed at 120° C. (oil bath) for 3 h. Volatiles were evaporated at reduced pressure. The residue was dissolved in 2 mL $H_2O$ and separated by Sephadex LH-20 size-exclusion chromatography. Fractions containing L-AST (>95%) were combined and concentrated at reduced pressure to give L-AST (1.9 mg, 75%) as a white solid; $^1$H NMR δ 1.73 (s, 3H), 2.08-2.29 (m, 4H), 3.83 (t, J=5.6 Hz, 1H); $^{13}$C NMR (15.66, 23.35, 28.80, 54.70, 173.52; HRMS m/z calcd for $C_5H_{13}AsNO_4$ [M+H]$^+$ 226.0055, found 226.0056 (FIGS. 16A, 16B and 17).

Example 1—Synthesis of 2-Chloroethyl(Methyl)Arsinic Acid 7 and its Conversion to AST 1

Figure 18:
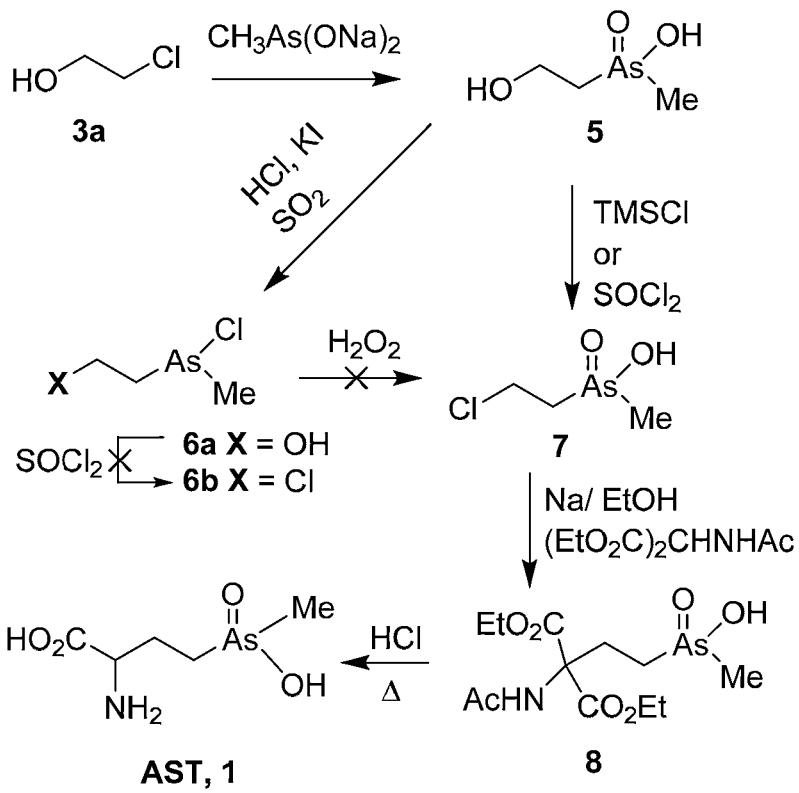
FIG. 18 shows the synthesis of 2-chloroethyl(methyl)arsinic acid 7 and its conversion to AST 1.

Pentavalent 2-hydroxyethyl(methyl)arsinic acid 5 and 2-chloroethyl(methyl)arsinic acid 7 were designed as crucial precursors. Nucleophilic displacement of chloride in 2-chloroethanol with sodium methylarsonite [MeAs(ONa)$_2$] provided 5 in 86% yield (FIG. 18). The sodium methylarsonite was prepared in 97% yield by in situ reduction of the sodium salt of methyl arsonate [MeAs(O)(OH)ONa] with $SO_2$ gas in the presence of HCl and catalytic amount of KI followed by hydrolysis of the resulting diiodo(methyl)arsine (MeAsI$_2$) with aqueous NaOH. Reduction of 5 with $SO_2$/HCl/KI yielded less polar trivalent chloro(2-hydroxyethyl)(methyl) arsine 6a, which appears to be susceptible to hydrolysis as it was observed for dichloro(2-hydroxyethyl)arsine. Treatment of crude 6a with SOCl$_2$ resulted in vigorous reaction and failed to give 6b, instead producing dichloro(2-hydroxyethyl)arsine with loss of methyl group. Reaction of the latter with $H_2O_2$, afforded (2-hydroxyethyl)arsonic acid instead of 7.

Treatment of 5 with TMSCl in DMSO afforded 7 [8%, based on $^1$H NMR and HPLC coupled with ICP-MS (inductively coupled plasma mass spectrometry)] in addition to unchanged 5. Subsequent reaction of this mixture with acetamidomalonate in the presence of sodium ethoxide at 70° C. yielded malonate 8. Reflux of crude 8 in 6 M HCl effected global deprotection and decarboxylation providing AST (5% overall from 5) as estimated based on ICP-MS. However, chlorination of the purified and iodide-free sodium salt of 5 with SOCl$_2$ provided 7 (85%, based on $^1$H NMR) containing also acidic form of substrate 5 (15%). Treatment of crude 7 with acetamidomalonate followed by deprotection and decarboxylation of the resulting 8 yielded AST (17%) after purification by Dowex and Sephadex column chromatography.

Example 2—Synthesis of AST Via Direct Methylation of AST-OH

Figure 19:
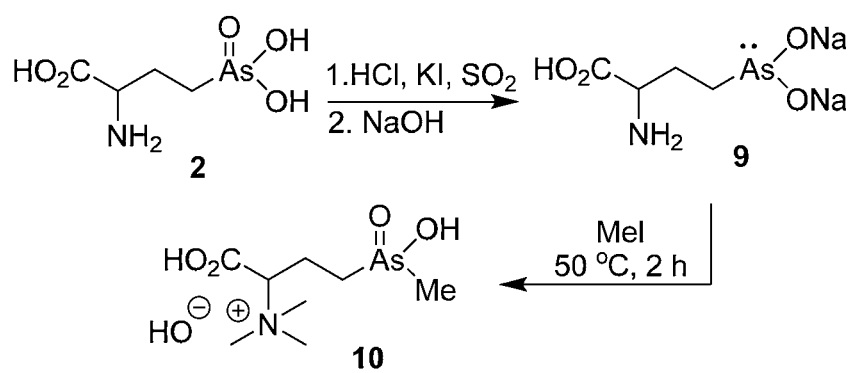
FIG. 19 shows the synthesis of AST via direct methylation of AST-OH.

The reduced As(III)T-OH 9 was chemically methylated with MeI as a source of an electrophilic methyl group. Reduction of AST-OH 2 with $SO_2$/HCl/KI (rt/15 min) followed by treatment with 6 M NaOH gave the reduced arsenic salt 9 (FIG. 19). Treatment of the alkaline solution of crude 9 with excess MeI effected methylation at arsenic atom. However, the reaction also resulted in methylation of the amino group yielding, after purification on cation exchange resin (Dowex® H$^+$ form) with NH$_4$OH, the trimethylammonium salt 10 (70%, from 2).

Figure 20:
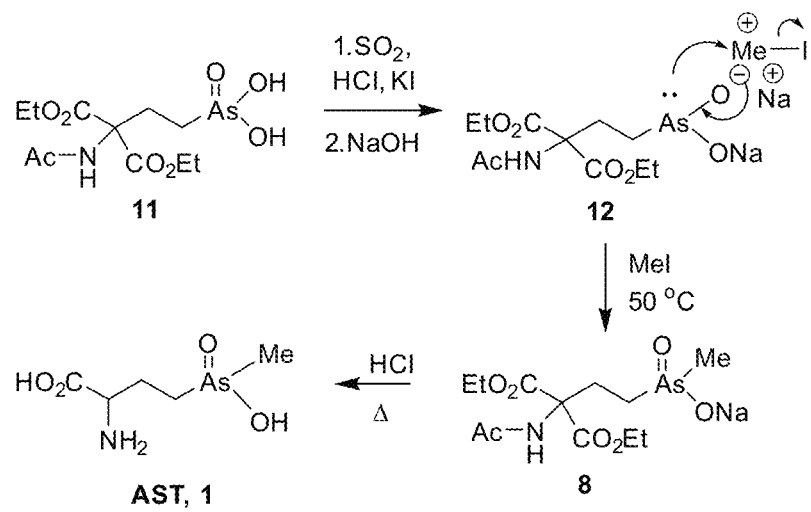
FIG. 20 shows the synthesis of AST from N-acetyl protected AST-OH derivative 11 via reduction and methylation.

Following encouraging methylation of 9 with MeI, the reduction/methylation sequence of the AST-OH derivative bearing the protected amino group would result in straightforward synthesis of AST. N-acyl protection was selected for the amino group in AST-OH, especially since the original synthesis of AST-OH and the improved protocol required synthesis of the N-acetyl protected derivative of type 11 (FIG. 20). Thus, treatment of (2-chloroethyl)arsonic acid with acetamidomalonate following purification from the excess of malonate afforded 11. Reduction of pure 11 with $SO_2$/HCl and catalytic KI followed by pH adjustment to ~11 with 6 M NaOH gave sodium salt of the trivalent arsenic compound 12. Subsequent treatment of 12 with MeI (50° C./4 h) resulted in exclusive methylation at the arsenic atom, providing protected pentavalent AST derivative 8. Excess MeI and elevated temperature were crucial for the optimal yield. The progress of the methylation reaction was monitored by HPLC-ICP-MS. Reflux of sodium salt of 8 in 6 M HCl effected global deprotection and decarboxylation providing crude AST. Purification on Dowex (H$^+$ form) column with 0.25 M NH$_4$OH followed by size-exclusion chromatography on Sephadex LH-20 with 70% (v/v) of EtOH/$H_2O$ afforded AST (D,L-AST) 1 (60%, from 11), presumably as a mixture of the D/L-enantiomers. The reduced As(III)T-OH byproduct (30%) was also isolated, whereas formation of dimethylated product was not observed.

The methylation of 12 with MeI in basic solution involves $S_N2$ attack of the nucleophilic arsenic species on the electrophilic methyl iodide with concurrent formation of the arsenic-oxygen double bond, which also oxidized trivalent arsenic to the pentavalent species 8. The reaction resembles a Michaelis-Arbuzov reaction of trivalent phosphorus esters with alkyl halides to form pentavalent phosphonate esters. Analogous conversion of trivalent to pentavalent organoarsenicals with alkyl halides has been noted.

Example 3—the Antibiotic Properties of the Chemically Synthesized AST 1

Figure 21:
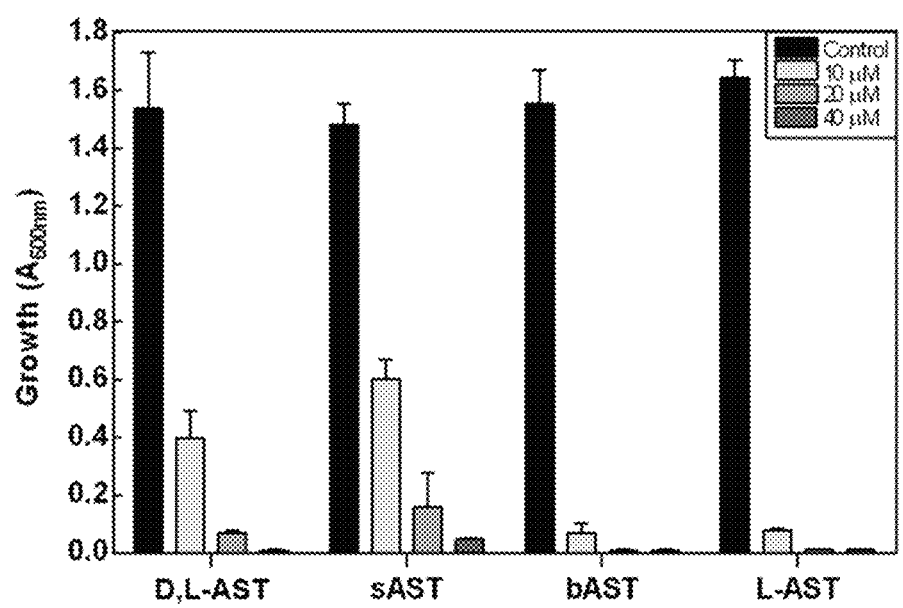
FIG. 21 shows that AST inhibits growth of E. coli. Cells were cultured in M9 medium in the absence or presence of the indicated concentrations of D/L-AST, D/L-sAST, L-bAST, L-AST. Growth was estimated from the $A_{600nm}$ after 16 h. Data are the mean±SE (n=3).

The antibiotic properties of the chemically synthesized AST 1 (D,L-AST, presumably a mixture of the D/L-enantiomers) were characterized and compared with those of biogenic AST (bAST, the L-enantiomer) and semisynthesized AST (sAST, a mixture of the D/L-enantiomers). Approximately twice as much D,L-AST or sAST was required to inhibit growth (FIG. 21) and GS activity (Table 1) of *Escherichia coli* as bAST, consistent with the L-enantiomer of b-AST as the active species.

TABLE 1

Inhibition of *E. coli* glutamine synthetase by AST

| AST | $K_i$ (µM) |
|---|---|
| Chemically synthesized (D/L-AST) | 0.75 ± 0.20 |
| Semisynthetic (D/L-sAST) | 0.65 ± 0.20 |
| Biogenic (L-bAST) | 0.30 ± 0.10 |

Figure 22:
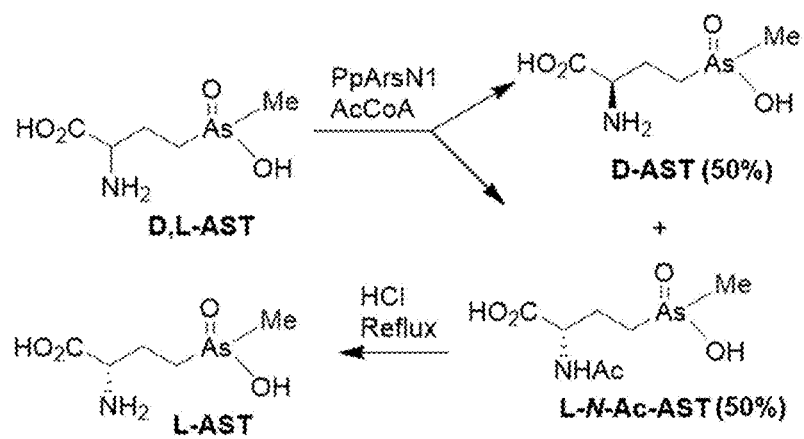
FIG. 22 shows the enzymatic acetylation of D,L-AST to L-N-Ac-AST 13 and chemical deacetylation of 13 to L-AST.

Example 4—Enzymatic Acetylation of D,L-AST to L-N-Ac-AST 13 and Chemical Deacetylation of 13 to L-AST ArsN1, the bacterial enzyme that confers AST resistance, catalyzes transfer of the acetyl group of acetyl coenzyme A (AcCoA) to the amine group of 1, generating acetyl-AST (L-N-Ac-AST, 13; FIG. 22). Purified PpArsN1 (ArsN1 from *Pseudomonas putida* KT2440) nearly completely converted bAST to an arsenic species predicted to be L-N-Ac-AST, while only 50% of racemic D,L-AST or sAST were converted to the putative species and the other half was unmodified (FIG. 23), consistent with only the L-enantiomer being the substrate of ArsN1, as predicted from L-AST-bound ArsN1 crystal structures.

Figure 23:
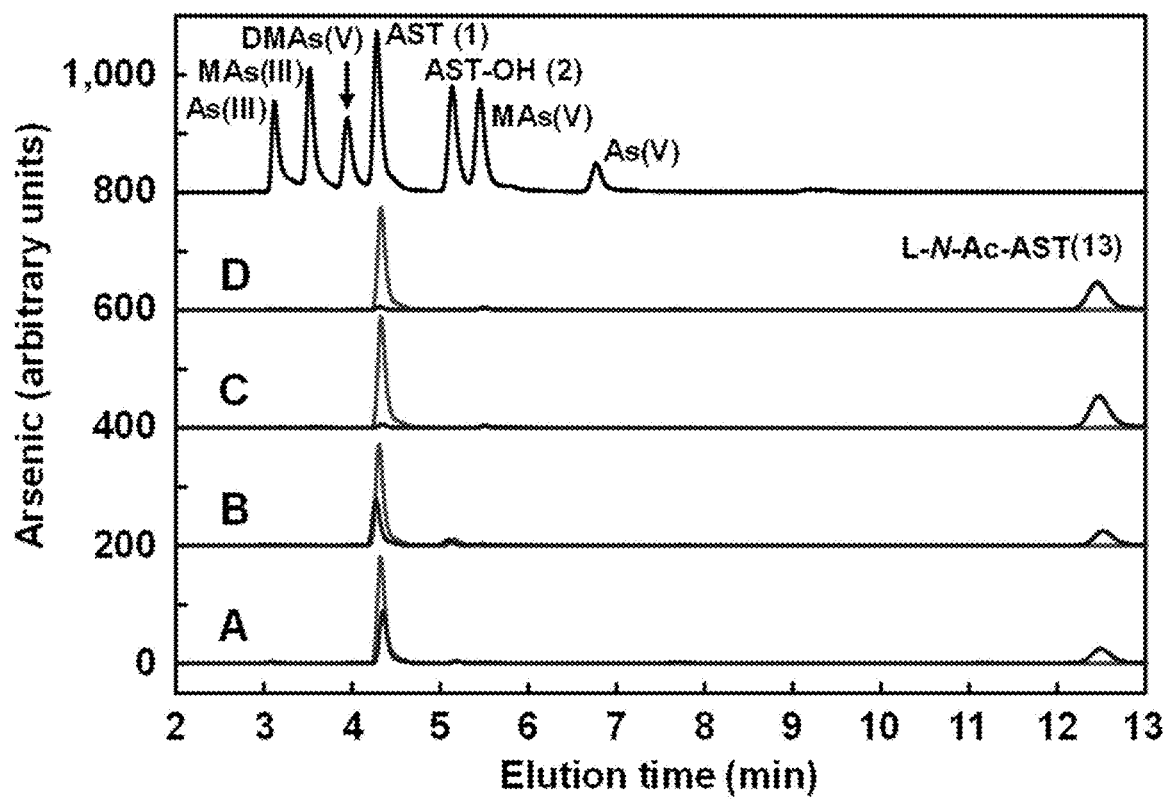
FIG. 23 shows the enzymatic acetylation of 1 to produce 13. Chemically synthesized D,L-AST (A), semisynthetic D/L-sAST (B), biogenic L-bAST (C) or L-enantiomeric (D) 1 was incubated in the absence (red lines) or presence (blue lines) of PpArsN1. The arsenic species in the reaction solutions were analyzed by HPLC-ICP-MS. Abbreviations: As(III), arsenite; MAs(III), methylarsenite; DMAs(V), dimethylarsenate; AST (1), arsinothricin; AST-OH (2), hydroxyarsinothricin; MAs(V), methylarsenate; As(V), arsenate; N-Ac-AST (13), N-acetylarsinothricin.

PpArsN1 was utilized to purify L-AST from D,L-AST. 7 mg of D,L-AST was incubated with purified PpArsN1 and AcCoA overnight, resulting in a mixture of D-AST and L-N-Ac-AST 13 (FIG. 22). Purification by size-exclusion chromatography on Sephadex LH-20 afforded 13 (3.0 mg, 36%) and D-AST (2.1 mg, 30%). Reflux of 13 in 2 M HCl effected acetyl deprotection providing L-AST after purification on Sephadex LH-20 column with 70% (v/v) of EtOH/H$_2$O. This product (L-AST), when treated PpArsN1/AcCoA, was acetylated quantitatively to 13, proving its enantiomeric purity (FIG. 23). L-AST inhibited growth of *E. coli* as effectively as biogenetic AST (bAST) isolated from rice rhizosphere bacterium (FIG. 21), further supporting the enantiomeric purity.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. These examples should not be construed as limiting. In addition, any elements or limitations of any invention or embodiment thereof disclosed herein can be combined with any and/or all other elements or limitations (individually or in any combination) or any other invention or embodiment thereof disclosed herein, and all such combinations are contemplated within the scope of the invention without limitation thereto.

We claim:

1. A method for synthesizing racemic arsinothricin (D,L-AST) comprising mixing 2-chloroethyl(methyl)arsinic acid with a malonate compound in the presence of a base; and adding an acid.

2. The method of claim 1, the malonate compound being an aminomalonate reagent.

3. The method of claim 2, the aminomalonate reagent comprising an amino group protected by a functional group.

4. The method of claim 3, the functional group being alkyl, substituted alkyl, acyl, substituted acyl, aryl or substituted aryl.

5. The method of claim 1, the base being sodium ethoxide or sodium methoxide.

6. The method of claim 1, the acid being HCl, HNO$_3$ or H$_2$SO$_4$.

7. The method of claim 1, the malonate compound being diethyl acetamidomalonate or dimethyl acetamidomalonate.

8. The method of claim 1, the method further comprising a step of enzymatic separation of L-AST.

9. The method of claim 1, the method further comprising mixing with an ArsN1 and acetyl coenzyme A (AcCoA) to produce a mixture of D-AST and L-N-Ac-AST; separating D-AST and L-N-Ac-AST; deacetylating L-N-Ac-AST and purifying L-AST.

10. A method for synthesizing racemic arsinothricin (D,L-AST) comprising: mixing 2-hydroxyethyl(methyl)arsinic acid with a halogen donor; adding a malonate compound with a base; and adding an acid.

11. The method of claim 10, the malonate compound being an aminomalonate reagent.

12. The method of claim 11, the aminomalonate reagent comprising an amino group protected by a functional group.

13. The method of claim 12, the functional group being alkyl, substituted alkyl, acyl, substituted acyl, aryl or substituted aryl.

14. The method of claim 10, the base being sodium ethoxide or sodium methoxide.

15. The method of claim 10, the acid being HCl, HNO$_3$ or H$_2$SO$_4$.

16. The method of claim 10, the halogen donor being TMSCl or SOCl$_2$.

17. The method of claim 10, the method further comprising mixing the synthesized D,L-AST with an ArsN1 and AcCoA to produce a mixture of D-AST and L-N-Ac-AST; separating D-AST and L-N-Ac-AST; deacetylating L-N-Ac-AST and purifying L-AST.

18. The method of claim 1, the method further comprising providing 2-chloroethyl(methyl)arsinic acid afforded by reacting pentavalent 2-hydroxyethyl(methyl)arsinic acid with a halogen donor.

19. The method of claim 18, the halogen donor being TMSCl or SOCl$_2$.

20. The method of claim 10, the method further comprising a step of enzymatic separation of L-AST.

* * * * *